US008966367B2

(12) United States Patent
Meaney et al.

(10) Patent No.: US 8,966,367 B2
(45) Date of Patent: Feb. 24, 2015

(54) ANCHOR OVERRIDE FOR A MEDIA-EDITING APPLICATION WITH AN ANCHORED TIMELINE

(71) Applicant: Apple Inc., Cupertino, CA (US)

(72) Inventors: Brian Meaney, Livermore, CA (US); Ken Matsuda, Sunnyvale, CA (US); Louis LaSalle, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 114 days.

(21) Appl. No.: 13/657,818

(22) Filed: Oct. 22, 2012

(65) Prior Publication Data

US 2013/0104042 A1 Apr. 25, 2013

Related U.S. Application Data

(63) Continuation-in-part of application No. 13/151,175, filed on Jun. 1, 2011, now Pat. No. 8,910,046.

(60) Provisional application No. 61/443,702, filed on Feb. 16, 2011, provisional application No. 61/443,704, filed on Feb. 16, 2011, provisional application No. 61/443,707, filed on Feb. 16, 2011, provisional application No. 61/443,692, filed on Feb. 16, 2011.

(51) Int. Cl.
*G06F 3/00* (2006.01)
*G06F 3/048* (2013.01)
(Continued)

(52) U.S. Cl.
CPC .............. *G06F 3/048* (2013.01); *G11B 27/034* (2013.01); *G11B 27/34* (2013.01)
USPC ........................................................ 715/716

(58) Field of Classification Search
CPC ............... H04N 21/4334; G06F 3/165; G10H 2210/125
USPC ........................................................ 715/716
See application file for complete search history.

(56) References Cited

U.S. PATENT DOCUMENTS 5,404,316 A 4/1995 Klingler et al.
5,467,288 A 11/1995 Fasciano et al.
(Continued)

FOREIGN PATENT DOCUMENTS

WO WO 2010/106586 9/2010

OTHER PUBLICATIONS

Final Cut Pro 6 for Digital Video Editors only. John Wiley and Sons/ Jan. 3, 2008. Available at: http://books.google.com/books?id=l80jR7qKcjkC&pg=PA72&lpg=PA72&dq=final+cut+pro+6+unlink&source=bl&ots=WzuYQ9AqJF&sig=IVGfnHDj2XIROt42GnDjWtL4MSg&hl=en&sa=X&ei=BTx5U92kM4jQsASFsIDgBw&ved=0CFMQ6AEwCQ#v=onepage&q=final%20cut%20pro%206%20unlink&f=false.*

(Continued)

*Primary Examiner* — Omar Abdul-Ali
(74) *Attorney, Agent, or Firm* — Adeli LLP

(57) ABSTRACT

Some embodiments provide a non-transitory machine readable medium that stores a media-editing application which when executed by at least one processing unit provides a graphical user interface (GUI) for creating a composite media presentation from several media clips. The GUI includes a composite display area for placing media clips to specify the composite media presentation. The composite display area includes (1) a primary lane for placing a primary sequence of media clips and (2) several secondary lanes for placing media clips that are anchored to media clips in the primary lane. The GUI includes an editing tool that includes a first mode for performing an edit operation to a particular media clip and a set of media clips anchored to the particular media clip and a second mode for performing the edit operation to the particular media clip without performing the edit operation to the set of media clips anchored to the particular media clip.

20 Claims, 23 Drawing Sheets

(51) Int. Cl.
    *G11B 27/034*     (2006.01)
    *G11B 27/34*      (2006.01)

(56) References Cited

U.S. PATENT DOCUMENTS

| | | | |
|---|---|---|---|
| 5,519,828 A | 5/1996 | Rayner | |
| 5,521,841 A | 5/1996 | Arman et al. | |
| 5,634,020 A | 5/1997 | Norton | |
| 5,659,539 A | 8/1997 | Porter et al. | |
| 5,659,792 A | 8/1997 | Walmsley | |
| 5,659,793 A | 8/1997 | Escobar et al. | |
| 5,664,216 A | 9/1997 | Blumenau | |
| 5,682,326 A | 10/1997 | Klingler et al. | |
| 5,732,184 A | 3/1998 | Chao et al. | |
| 5,781,188 A | 7/1998 | Amiot et al. | |
| 5,826,102 A | 10/1998 | Escobar et al. | |
| 5,892,507 A | 4/1999 | Moorby | |
| 5,930,446 A | 7/1999 | Kanda | |
| 5,940,573 A | 8/1999 | Beckwith | |
| 5,999,173 A * | 12/1999 | Ubillos | 715/724 |
| 6,061,062 A | 5/2000 | Venolia | |
| 6,134,380 A | 10/2000 | Kushizaki | |
| 6,144,375 A | 11/2000 | Jain et al. | |
| 6,154,600 A | 11/2000 | Newman et al. | |
| 6,154,601 A | 11/2000 | Yaegashi et al. | |
| 6,204,840 B1 | 3/2001 | Petelycky et al. | |
| 6,324,335 B1 | 11/2001 | Kanda | |
| 6,392,710 B1 | 5/2002 | Gonsalves et al. | |
| 6,400,378 B1 | 6/2002 | Snook | |
| 6,414,686 B1 | 7/2002 | Protheroe et al. | |
| 6,477,315 B1 | 11/2002 | Ohomori | |
| 6,486,896 B1 | 11/2002 | Ubillos | |
| 6,539,163 B1 | 3/2003 | Sheasby et al. | |
| 6,544,294 B1 | 4/2003 | Greenfield et al. | |
| 6,546,188 B1 | 4/2003 | Ishii et al. | |
| 6,628,303 B1 | 9/2003 | Foreman et al. | |
| 6,650,826 B1 | 11/2003 | Hatta | |
| 6,658,194 B1 | 12/2003 | Omori | |
| 6,714,216 B2 | 3/2004 | Abe | |
| 6,771,285 B1 * | 8/2004 | McGrath et al. | 715/723 |
| 6,928,613 B1 | 8/2005 | Ishii et al. | |
| 7,035,435 B2 | 4/2006 | Li et al. | |
| 7,043,137 B2 | 5/2006 | Slone | |
| 7,062,713 B2 | 6/2006 | Schriever et al. | |
| 7,073,127 B2 | 7/2006 | Zhao et al. | |
| 7,207,007 B2 | 4/2007 | Moriwake et al. | |
| 7,313,755 B2 | 12/2007 | Rahman et al. | |
| 7,325,199 B1 | 1/2008 | Reid | |
| 7,398,002 B2 | 7/2008 | Hsiao et al. | |
| 7,434,155 B2 | 10/2008 | Lee | |
| 7,437,674 B2 | 10/2008 | Chen | |
| 7,444,593 B1 | 10/2008 | Reid | |
| 7,480,864 B2 | 1/2009 | Brook et al. | |
| 7,518,611 B2 | 4/2009 | Boyd et al. | |
| 7,546,532 B1 | 6/2009 | Nichols et al. | |
| 7,623,755 B2 | 11/2009 | Kuspa | |
| 7,653,550 B2 | 1/2010 | Schulz | |
| 7,669,130 B2 | 2/2010 | Agarwal et al. | |
| 7,720,349 B2 | 5/2010 | Ogikubo | |
| 7,770,125 B1 | 8/2010 | Young et al. | |
| 7,805,678 B1 | 9/2010 | Niles et al. | |
| 7,856,424 B2 | 12/2010 | Cisler et al. | |
| 7,890,867 B1 | 2/2011 | Margulis | |
| 7,954,065 B2 | 5/2011 | Ubillos | |
| 7,992,097 B2 | 8/2011 | Ubillos | |
| 8,020,100 B2 | 9/2011 | Ubillos et al. | |
| 8,265,300 B2 | 9/2012 | Reid et al. | |
| 8,418,082 B2 | 4/2013 | Meaney et al. | |
| 8,533,598 B2 | 9/2013 | Meaney et al. | |
| 8,631,326 B2 | 1/2014 | Meaney et al. | |
| 8,769,421 B2 | 7/2014 | Meaney et al. | |
| 2001/0020953 A1 | 9/2001 | Moriwake et al. | |
| 2001/0036356 A1 | 11/2001 | Weaver et al. | |
| 2001/0040592 A1 | 11/2001 | Foreman et al. | |
| 2002/0023103 A1 | 2/2002 | Gagne | |
| 2002/0089540 A1 | 7/2002 | Geier et al. | |
| 2002/0154140 A1 | 10/2002 | Tazaki | |
| 2002/0154156 A1 | 10/2002 | Moriwake et al. | |
| 2002/0156805 A1 | 10/2002 | Schriever et al. | |
| 2003/0002851 A1 | 1/2003 | Hsiao et al. | |
| 2003/0016254 A1 | 1/2003 | Abe | |
| 2003/0090504 A1 | 5/2003 | Brook et al. | |
| 2003/0117431 A1 | 6/2003 | Moriwake et al. | |
| 2004/0001079 A1 | 1/2004 | Zhao et al. | |
| 2004/0066395 A1 | 4/2004 | Foreman et al. | |
| 2004/0090462 A1 | 5/2004 | Graham | |
| 2004/0100482 A1 | 5/2004 | Cajolet et al. | |
| 2004/0125124 A1 | 7/2004 | Kim et al. | |
| 2004/0201609 A1 | 10/2004 | Obrador | |
| 2005/0132293 A1 | 6/2005 | Herberger et al. | |
| 2005/0201724 A1 | 9/2005 | Chu | |
| 2005/0216840 A1 | 9/2005 | Salvucci | |
| 2006/0008247 A1 | 1/2006 | Minami et al. | |
| 2006/0059426 A1 | 3/2006 | Ogikubo | |
| 2006/0136556 A1 | 6/2006 | Stevens et al. | |
| 2006/0150072 A1 | 7/2006 | Salvucci | |
| 2006/0155684 A1 | 7/2006 | Liu et al. | |
| 2006/0168521 A1 | 7/2006 | Shimizu et al. | |
| 2006/0184980 A1 | 8/2006 | Cole | |
| 2007/0016872 A1 | 1/2007 | Cummins et al. | |
| 2007/0168873 A1 | 7/2007 | Lentz | |
| 2007/0189708 A1 | 8/2007 | Lerman et al. | |
| 2007/0192729 A1 | 8/2007 | Downs | |
| 2007/0203945 A1 | 8/2007 | Louw | |
| 2007/0260968 A1 * | 11/2007 | Howard et al. | 715/500.1 |
| 2008/0044155 A1 * | 2/2008 | Kuspa | 386/52 |
| 2008/0104127 A1 | 5/2008 | Billmaier et al. | |
| 2008/0120328 A1 | 5/2008 | Delgo et al. | |
| 2008/0126191 A1 | 5/2008 | Schiavi | |
| 2008/0138034 A1 | 6/2008 | Hiroi et al. | |
| 2008/0155420 A1 | 6/2008 | Ubillos et al. | |
| 2008/0155459 A1 | 6/2008 | Ubillos | |
| 2008/0253735 A1 | 10/2008 | Kuspa et al. | |
| 2008/0256449 A1 | 10/2008 | Bhatt | |
| 2009/0006475 A1 | 1/2009 | Udezue et al. | |
| 2009/0089690 A1 | 4/2009 | Chi et al. | |
| 2009/0100339 A1 | 4/2009 | Wharton-Ali et al. | |
| 2009/0172543 A1 | 7/2009 | Cronin et al. | |
| 2010/0050080 A1 | 2/2010 | Libert et al. | |
| 2010/0077289 A1 | 3/2010 | Das et al. | |
| 2010/0153395 A1 | 6/2010 | Hannuksela et al. | |
| 2010/0153520 A1 | 6/2010 | Daun et al. | |
| 2010/0158471 A1 | 6/2010 | Ogikubo | |
| 2010/0278504 A1 | 11/2010 | Lyons et al. | |
| 2010/0281381 A1 | 11/2010 | Meaney et al. | |
| 2010/0281382 A1 | 11/2010 | Meaney et al. | |
| 2010/0281383 A1 | 11/2010 | Meaney et al. | |
| 2011/0010624 A1 | 1/2011 | Vanslette et al. | |
| 2011/0103772 A1 | 5/2011 | Suzuki | |
| 2012/0210221 A1 | 8/2012 | Khan et al. | |
| 2012/0210222 A1 | 8/2012 | Matsuda et al. | |
| 2012/0210230 A1 | 8/2012 | Matsuda et al. | |
| 2012/0210231 A1 | 8/2012 | Ubillos et al. | |

OTHER PUBLICATIONS

Author Unknown, "Using Adobe Premiere Pro CS4", Apr. 24, 2009, 499 pages, Adobe Systems Incorporated, San Jose, California, USA.

Author Unknown, "Apple Announces Final Cut Pro 4," NAB, Apr. 6, 2003, 3 pages, Apple Inc., Las Vegas, NV, USA.

Author Unknown, "Adobe Director 11: User Guide," Month Unknown, 2008, 498 pages, Adobe Systems Incorporated, San Jose, California, USA.

Author Unknown, "Adobe Premiere Elements 7: Arranging clips in the Sceneline," Dec. 11, 2008, 3 pages, http://help.adobe.com/en_13 US/PremiereElements/7.0/WSB04491A8-859D-41e7-975F-0E26B9AECB9B.html.

Author Unknown, "Adobe Premiere Pro CS3: Classroom in a Book", Month Unknown, 2008, 27 pages, Chapters 9 and 10, Adobe Systems Incorporated, San Jose, California, USA.

Author Unknown, "Adobe Premiere Pro CS3: User Guide," Apr. 1, 2008, 455 pages, Adobe Systems Incorporated, San Jose, California, USA.

(56) References Cited

OTHER PUBLICATIONS

Author Unknown, "Frame-specific editing with snap—Premiere Pro CS4 Classroom in a Book," Dec. 17, 2008, 17 pages, Adobe Press, USA.
Author Unknown, "iMovie '08 Getting Started," Month Unknown, 2008, pp. 1-50, Apple Inc., USA.
Author Unknown, "Using Adobe Flash CS4 Professional," updated Mar. 5, 2009, 474 pages, Adobe Systems Incorporated, San Jose, California, USA.
Author Unknown, "Using Adobe Premiere Elements 8 Editor", last updated Aug. 12, 2010, 313 pages, Adobe Systems Incorporated, San Jose, California, USA.
Author Unknown, "Work with clips in Windows Movie Maker," Oct. 13, 2009, 4 pages, Microsoft, USA.
Bolante, Anthony, "Premiere Pro CS3 for Windows and Macintosh: Visual QuickPro Guide", Dec. 4, 2007, 2 pages, Peachpit Press, USA.
Brenneis, Lisa, "Final Cut Pro 3 for Macintosh: Visual QuickPro Guide," Apr. 2002, 288 pages, Peachpit Press, Berkeley, California, USA.
Casares, Juan, et al., "Simplifying Video Editing Using Metadata," Proceedings of Designing Interactive Systems (DIS 2002), Jun. 2002, 10 pages, London, Great Britain.
Chisan, James, et al., "Video Bench—Final Report: SEng 480a/CSc 586a," Apr. 11, 2003, pp. 1-43, University of Victoria, Canada.
Kutics, Andrea, et al., "Use of Adaptive Still Image Descriptors for Annotation of Video Frames," Lecture Notes in Computer Science, Month Unknown, 2007, pp. 686-697, vol. 4633, Springer-Verlag, Berlin, Heidelberg.
Long, A. Chris, et al., "Video Editing Using Lenses and Semantic Zooming," Month Unknown, 2002, pp. 1-9, Human Computer Interaction Institute, Carnegie Mellon University, Pittsburgh, Pennsylvania, USA.
Martin, Steve, "Final Cut Express: System Requirements, OS 10.2 or higher," The Ripple Training, Jan. 13, 2003, pp. 1-8, USA.
Myers, Brad A., et al., "A Multi-View Intelligent Editor for Digital Video Libraries," The First ACM+IEEE Joint Conference on Digital Libraries (JCDL'01), Jun. 24-28, 2001, 10 pages, Roanoke, Virginia, USA.
Oetzmann, Anthony, et al., "Audacity—Editing for Beginners Part 2—Cut, Copy and Paste," Apr. 12, 2004, 3 pages, http://audacity.sourceforge.net/manual-1.2/tutorial_ed_beginner2.html.
Sauer, Jeff, "Review: Apple Final Cut Pro 4," Oct. 3, 2003, pp. 1-7.
Stone, Ken, "The Basics—Editing with Transitions in Final Cut Pro," The Ken Stone Index, Jun. 12, 2001, pp. 1-8.
Wang, Yijin, et al. "*MyVideos*—A System for Home Video Management," Proceedings of the 10th ACM International Conference on Multimedia, Dec. 1-6, 2002, pp. 412-413, Juan-les-Pins, France.
Author Unknown, "Adobe Premiere Pro CS4 Classroom in a Book", Dec. 17, 2008, 11 pages, Adobe Press, USA.
Author Unknown, "Using Adobe Premiere Pro CS4," Updated Jan. 27, 2009, Part 1 of 2, pp. i to 256, Adobe Systems Inc., San Jose, California, USA.
Author Unknown, "Using Adobe Premiere Pro CS4," Updated Jan. 27, 2009, Part 2 of 2, pp. 257 to 482, Adobe Systems Inc., San Jose, California, USA.

\* cited by examiner

ANCHOR OVERRIDE FOR A MEDIA-EDITING APPLICATION WITH AN ANCHORED TIMELINE

CLAIM OF BENEFIT TO PRIOR APPLICATIONS

This application is a continuation-in-part of U.S. patent application Ser. No. 13/151,175, filed Jun. 1, 2011, now issued as U.S. Pat. No. 8,910,046. U.S. patent application Ser. No. 13/151,175 claims benefit to U.S. Provisional Patent Application 61/443,702, filed Feb. 16, 2011; U.S. Provisional Patent Application 61/443,704, filed Feb. 16, 2011; U.S. Provisional Patent Application 61/443,707, filed Feb. 16, 2011; and U.S. Provisional Patent Application 61/443,692, filed Feb. 16, 2011. U.S. Pat. No. 8,910,046 and U.S. Provisional Patent Applications 61/443,702, 61/443,704, 61/443,707, and 61/443,692, are incorporated herein by reference.

BACKGROUND

Digital graphic design, image editing, audio editing, and video editing applications (hereafter collectively referred to as media content editing applications or media editing applications) provide graphical designers, media artists, and other users with the necessary tools to create a variety of media content. Examples of such applications include Final Cut Pro® and iMovie®, both sold by Apple, Inc. These applications give users the ability to edit, combine, transition, overlay, and piece together different media content in a variety of manners to create a resulting media project. The resulting media project specifies a particular sequenced composition of any number of text, audio, image, and/or video content elements that is used to create a media presentation.

Various media editing applications facilitate such composition through electronic means. Specifically, a computer or other electronic device with a processor and computer readable storage medium executes the media editing application. In so doing, the computer generates a graphical interface whereby designers digitally manipulate graphical representations of the media content to produce a desired result. However, in many cases, the designers experience inconvenience in manipulating graphical representations of the media content because of the shortcomings of the existing applications. Moreover, it is difficult to manage graphical representations of media content when there are too many graphical representations.

BRIEF SUMMARY

Some embodiments of the invention provide a media-editing application with a novel spine-based timeline. The media application of some embodiments includes a timeline, which is a composite display area for displaying media clips that are part of the composite media presentation. Specifically, the timeline in some embodiments displays one or more geometric shapes that represent one or more media clips that are part of the composite presentation. The timeline of some embodiments includes a primary lane (also called "spine") as well as one or more secondary lanes (also called "anchor lanes"). The spine represents a primary sequence of media, which, in some embodiments, does not have any gaps. When a clip is deleted or removed from the timeline, the media-editing applications automatically closes the gap created in place of the clip. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

The media-editing application of some embodiments allows any types of clip (e.g., text clip, image clip, audio clip, video clip, audio and video clip, etc.) to be anchored clips. The spine can also be used to place any types of clips. In other words, the spine is not just for placing video clips in some embodiments. Also, anchored clips can be placed above or below the spine. The audio clips are generally placed below the spine, but can be moved above the spine near another clip in the spine.

In some embodiments, the media-editing application allows the user of the media-editing application to anchor a media clip to another media clip displayed in the timeline by selecting a single media clip or a range of media clip(s) from the clip browser and dragging the selected clip or a range above or below a media clip displayed in the timeline. As described above, the media-editing application in some embodiments anchors a media clip only to a media clip in the central compositing lane. In other embodiments, the media clip that is anchored to may be any clip displayed in any lanes in the timeline. That is, the media-editing application of these embodiments allows the user to anchor a media clip to a media clip that is in the spine or to a media clip that is anchored to another media clip.

The media-editing application of some embodiments provides several behaviors with respect to the anchored clips. For instance, in some embodiments, the user of the media-editing application can modify the position of the anchor with respect to the anchored clip, or modify the position of anchored clip with respect to the anchor. As described above, the media-editing application of some embodiments allows a user of the application to select a clip or a range of clip from a clip browser of the media-editing application and anchor the selected media clip or the range to another media clip displayed in a timeline. In some embodiments, the media-editing application attaches an anchor to the beginning (i.e., the in-point) of the media clip when the media clip is anchored to another media clip in the timeline. In some such embodiments, the media-editing application also allows the user to attach an anchor to a media clip other than to the beginning of the media clip when the media clip is anchored to another media clip in the timeline. For instance, the media-editing application allows the user to select and drag a media clip by placing a cursor on the media clip. The position of the cursor along the length of the media clip becomes the position of the anchor of the media clip when the media clip is anchored to another media clip.

Some embodiments allow the user of the media-editing application to trim a media clip displayed in the timeline. The media-editing application of these embodiments allows the user to trim any media clip in any lanes of the timeline. That is, an anchored clip as well as a clip in the spine can be trimmed by the media-editing application. Different embodiments provide different ways of trimming a media clip from either end of the media clip. For instance, the media-editing application allows the user to drag either side edge of a media clip to pull in or push out the in- or out-point of the media clip.

In some embodiments, the media-editing application allows the user of the application to trim frames off one end of a media clip while extending the same number of frames on the other end of the media clip. In this manner, some embodiments retain the clip's duration and position within the timeline while the frames of the media clip are trimmed off one end and extended on the other end of the clip. Each of clips in some embodiments has a source clip from which the clip is created. Depending on the in- and out-points of the clip, the source clip may include additional media content (e.g., frames) that can be added before an in-point and after an out-point of a media clip. The media-editing application of some embodiments allows the user to change both in- and out-points of a media clip at the same by moving both in- and out-points by the same number of frames in one direction along the source media clip.

In some cases, the media-editing application moves an anchored clip along the timeline according to the user inputs (e.g., user's selection of the anchored clip and dragging to the right or the left). In such cases, the media-editing application concurrently displays in the preview display area a frame that comes before the first frame of the anchored clip and a frame that comes after the last frame of the anchored clip as the anchored clip is being moved. In some cases, the media-editing application performs a slip edit to an anchored clip. In such cases, the media-editing application concurrently displays the current first frame of the anchored clip and the current last frame of the anchored clip in the preview display area as the edit is being performed.

As mentioned above, clips can be anchored to other clips in some embodiments. When an edit operation is performed on a particular clip that modifies the positions of the particular clip's frames with respect to the media presentation, the media-editing application moves the anchored clips along with the particular clip such that the particular clip's frames at which the anchored clips are anchored are maintained.

Another feature provided by the media-editing application of some embodiments allows a user to perform an edit operation on a clip without moving any clips anchored to the clip. For instance, in some embodiments, the media-editing application provides a feature that allows a user to move a particular clip within the timeline, perform a slide edit on the particular clip, perform a slip edit on the particular clip, etc., while maintaining the position of any clips (and the clips' anchor points), with respect to the media presentation, that were anchored to the particular clip.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
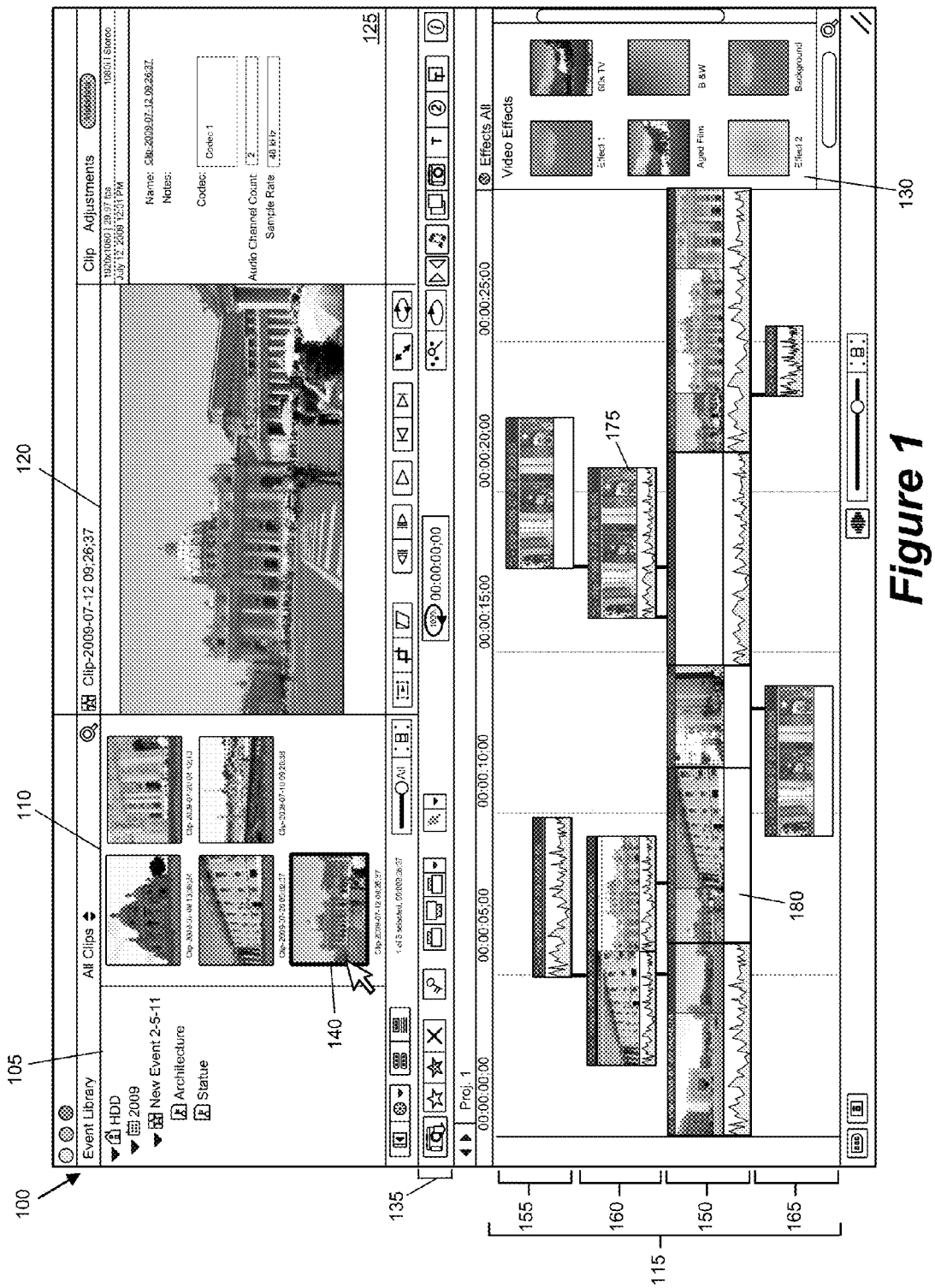
FIG. 1 illustrates a graphical user interface (GUI) of a media-editing application of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a media-editing application that creates a composite media presentation, some embodiments of the invention provide a novel compositing display area in which several media clips can be arranged for compositing. This novel compositing display area will be referred to as a "timeline" throughout this application unless specified otherwise. This timeline of some embodiments is capable of performing numerous novel features, some of which will be described in detail further below.

A media clip in some embodiments is a piece of media content. Examples of types of media content include audio data, video data, audio and video data, text data, image/picture data, and/or other media data. In some embodiments, a media clip can be a video clip or an audio clip. In other embodiments, a media clip can be a video clip, an audio clip, an audio and video clip, a sequence of media clips (also referred to as a media clip sequence), a text clip, a text overlay, a still image or picture, or any other type of media clip that can be used to create a composite presentation. In this application, a media clip may also refer to the graphical representation of the media clip in the GUI of a media-editing application of some embodiments.

A media clip that has a temporal component (e.g., audio media clips, video media clips, audio and video media clips, etc.) is further defined by an in-point and an out-point with respect to a source media file in some embodiments. In some such embodiments, the source media file is stored on the computing device on which the media-editing application executes or on a computing device to which the media-editing application has access. A media clip's in- and out-points define its start and end points with respect to the source media file.

The in- and out-points of a media clip can be defined as such to cover an entire source media file or a portion of the source media file in some embodiments. Several media clips can define different in- and out-points with respect to the same source media file such that each media clip has a different media content. For instance, the in- and out-points of a media clip can be defined to be the first half of a source media file while the in and out points of another media clip can be defined to be the second half of the same source media file.

In some embodiments, a media clip can serve as another media clip's source. For instance, the media-editing application allows the user to select a range (i.e., a length along the length of a graphical representation of a media clip that corresponds to a duration within the media clip) and use the selected range like a media clip.

Several detailed embodiments of the invention are described in the sections below. Section I describes various features of the spine-based timeline in some embodiments. Section II describes various edit operations that the media-editing application performs on the media clips displayed in the spine based timeline. Section III then describes data structures of media clips used by some embodiments. several editing tools that the media-editing application provides. Next, section IV describes the software architecture of a media-editing application of some embodiments. Finally, Section V describes an electronic system that implements some embodiments of the invention.

I. Timeline

FIG. 1 illustrates a graphical user interface (GUI) 100 of a media-editing application of some embodiments. One of ordinary skill will recognize that the graphical user interface 100 is only one of many possible GUIs for such a media-editing application. In fact, the GUI 100 includes several display areas which may be adjusted in size, opened or closed, replaced with other display areas, etc. The GUI 100 includes a clip library 105, a clip browser 110, a timeline 115, a preview display area 120, an inspector display area 125, an additional media display area 130, and a toolbar 135.

The clip library 105 includes a set of folders through which a user accesses media clips that have been imported into the media-editing application. Some embodiments organize the media clips according to the device (e.g., physical storage device such as an internal or external hard drive, virtual storage device such as a hard drive partition, etc.) on which the media represented by the clips are stored. Some embodiments also enable the user to organize the media clips based on the date the media represented by the clips was created (e.g., recorded by a camera). As shown, the clip library 105 includes media clips from both 2009 and 2011.

Within a storage device and/or date, users may group the media clips into "events", or organized folders of media clips. For instance, a user might give the events descriptive names that indicate what media is stored in the event (e.g., the "New Event 2-8-09" event shown in clip library 105 might be renamed "European Vacation" as a descriptor of the content). In some embodiments, the media files corresponding to these clips are stored in a file storage structure that mirrors the folders shown in the clip library.

Within the clip library, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc. In addition, some embodiments allow a user to create sub-folders of an event. These sub-folders may include media clips filtered based on tags (e.g., keyword tags). For instance, in the "New Event 2-8-09" event, all media clips showing children might be tagged by the user with a "kids" keyword, and then these particular media clips could be displayed in a sub-folder of the event that filters clips in this event to only display media clips tagged with the "kids" keyword.

The clip browser 110 allows the user to view clips from a selected folder (e.g., an event, a sub-folder, etc.) of the clip library 105. As shown in this example, the folder "New Event 2-8-11 3" is selected in the clip library 105, and the clips belonging to that folder are displayed in the clip browser 110. Some embodiments display the clips as thumbnail filmstrips, as shown in this example. By moving a cursor (or a finger on a touchscreen) over one of the thumbnails (e.g., with a mouse, a touchpad, a touchscreen, etc.), the user can skim through the clip. That is, when the user places the cursor at a particular horizontal location within the thumbnail filmstrip, the media-editing application associates that horizontal location with a time in the associated media file, and displays the image from the media file for that time. In addition, the user can command the application to play back the media file in the thumbnail filmstrip.

In addition, the thumbnails for the clips in the browser display an audio waveform underneath the clip that represents the audio of the media file. In some embodiments, as a user skims through or plays back the thumbnail filmstrip, the audio plays as well. There are several types of clips. An audio and video clip is a clip that contains both audio and video content. An audio clip is a clip that contains only audio content. A video clip is a clip that contains only video content.

Many of the features of the clip browser are user-modifiable. For instance, in some embodiments, the user can modify one or more of the thumbnail size, the percentage of the thumbnail occupied by the audio waveform, whether audio plays back when the user skims through the media files, etc. In addition, some embodiments enable the user to view the clips in the clip browser in a list view. In this view, the clips are presented as a list (e.g., with clip name, duration, etc.). Some embodiments also display a selected clip from the list in a filmstrip view at the top of the browser so that the user can skim through or playback the selected clip.

The timeline 115 provides a visual representation of a composite presentation (or project) being created by the user of the media-editing application. Specifically, it displays one or more geometric shapes that represent one or more media clips that are part of the composite presentation. The timeline 115 of some embodiments includes a primary lane (also called a "spine", "primary compositing lane", or "central compositing lane") as well as one or more secondary lanes (also called "anchor lanes") above and/or below the primary lane. The spine represents a primary sequence of media which, in some embodiments, does not have any gaps. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

Clips placed in the anchor lanes are referred to as "anchored clips." As an example, FIG. 1 shows a media clip 175 that is anchored off of another media clip 180 in the timeline 115. In some of these embodiments, media clips can be placed in these anchor lanes to anchor off of media clips in the central compositing lane 150. Instead of, or in conjunction with, having several levels of media clips that anchor off the central compositing lane 150, some embodiments allow media clips to be placed in these anchor lanes and to be anchored off of other anchored media clips placed in these anchor lanes. To help the user distinguish the central compositing lane 150 and the anchored lanes in the timeline 115, some embodiments use different tones for these lanes. For instance, the timeline 115 uses a darker tone for the central compositing lane 150 than the tone for the anchored lanes 155, 160, and 165.

As shown, the timeline 115 can place different types of media clips in the same lane (a central compositing lane or an anchored lane). Also, the timeline 115 can place different types of media clips in the anchor lanes above and below the central compositing lane. In other words, the timeline 115 can place a media clip of any type (e.g., audio clip, video clip, audio and video clip, etc.) in any lane of the timeline 115.

Also, when there are multiple anchored clips at a position along the timeline 115, the media content of an anchored clip in an upper anchor lane takes the priority over the media content of a media clip in a lower lane in some embodiments. For instance, the video content of the media clip in the uppermost anchor lane will be the content of the presentation for the period time along the timeline that the media clip spans.

As with the clips in the clip browser, the user can skim through the timeline or play back the timeline (either a portion of the timeline or the entire timeline). In some embodiments, the playback (or skimming) is not shown in the timeline clips, but rather in the preview display area 120.

The preview display area 120 (also referred to as a "viewer") displays images from media files that the user is skimming through, playing back, or editing. These images may be from a composite presentation in the timeline 115 or from a media clip in the clip browser 110. In this example, the user has been skimming through the beginning of clip 140, and therefore an image from the start of this media file is displayed in the preview display area 120. As shown, some embodiments will display the images as large as possible within the display area while maintaining the aspect ratio of the image.

The inspector display area 125 displays detailed properties about a selected item and allows a user to modify some or all of these properties. The selected item might be a clip, a composite presentation, an effect, etc. In this case, the clip that is shown in the preview display area 120 is also selected, and thus the inspector displays information about media clip 140. This information includes duration, file format, file location, frame rate, date created, audio information, etc. about the selected media clip. In some embodiments, different information is displayed depending on the type of item selected.

The additional media display area 130 displays various types of additional media, such as video effects, transitions, still images, titles, audio effects, standard audio clips, etc. In some embodiments, the set of effects is represented by a set of selectable UI items, each selectable UI item representing a particular effect. In some embodiments, each selectable UI item also includes a thumbnail image with the particular effect applied. The display area 130 is currently displaying a set of effects for the user to apply to a clip. In this example, only two effects are shown in the display area (the keyer effect and the luma keyer effect, because the user has typed the word "keyer" into a search box for the effects display area).

The toolbar 135 includes various selectable items for editing, modifying what is displayed in one or more display areas, etc. The right side of the toolbar includes various selectable items for modifying what type of media is displayed in the additional media display area 130. The illustrated toolbar 135 includes items for video effects, visual transitions between media clips, photos, titles, generators and backgrounds, etc. In addition, the toolbar 135 includes an inspector selectable item that causes the display of the inspector display area 125 as well as items for applying a retiming operation to a portion of the timeline, adjusting color, trimming, anchoring, creating position clips, and other functions.

The left side of the toolbar 135 includes selectable items for media management and editing. Selectable items are provided for adding clips from the clip browser 110 to the timeline 115. In some embodiments, different selectable items may be used to add a clip to the end of the spine, add a clip at a selected point in the spine (e.g., at the location of a playhead), add an anchored clip at the selected point, perform various trim operations on the media clips in the timeline, etc. The media management tools of some embodiments allow a user to mark selected clips as favorites, among other options.

One or ordinary skill will also recognize that the set of display areas shown in the GUI 100 is one of many possible configurations for the GUI of some embodiments. For instance, in some embodiments, the presence or absence of many of the display areas can be toggled through the GUI (e.g., the inspector display area 125, additional media display area 130, and clip library 105). In addition, some embodiments allow the user to modify the size of the various display areas within the UI. For instance, when the display area 130 is removed, the timeline 115 can increase in size to include that area. Similarly, the preview display area 120 increases in size when the inspector display area 125 is removed.

II. Editing in Timeline

A. Anchoring a Media Clip

Figure 2:
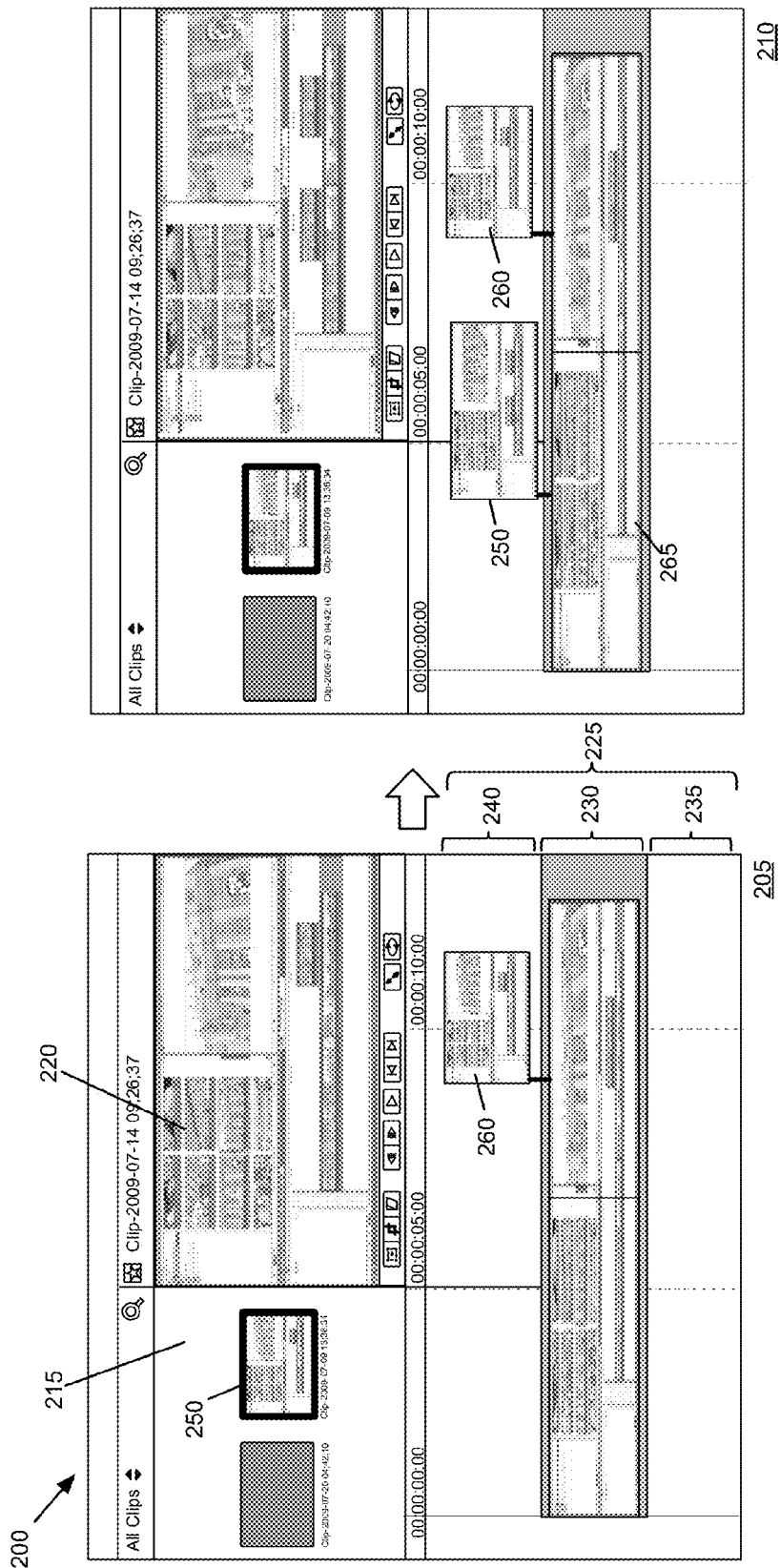
FIG. 2 illustrates an example of anchoring a media clip to another media clip displayed in a timeline of a media-editing application.

FIG. 2 illustrates an example of anchoring a media clip to another media clip displayed in a timeline of a media-editing application. Specifically, this figure illustrates a GUI 200 in two different stages 205 and 210 to show the media-editing application allows a user of the application to select a media clip from a clip browser and anchor the clip to another clip in the timeline 225. The GUI 200 is similar to the GUI 100 described above by reference to FIG. 1 in that the GUI 200 includes a clip browser 215, a preview display area 220, and a timeline 225 which are similar to the clip browser 110, the preview display area 120, and the timeline 115, respectively.

Some embodiments allow the user to anchor a media clip to another media clip in the timeline 225 by selecting a single media clip or a range of media clip from the clip browser and drag it above or below a media clip in the timeline 225. As described above, the media-editing application in some embodiments anchors a media clip only to a media clip in the central compositing lane 230. In other embodiments, the media clip that is anchored to may be any clip displayed in any lanes in the timeline 225. That is, the media-editing application of these embodiments allows the user to anchor a media clip to a media clip that is in the central compositing lane 230 or to a media clip that is anchored to another media clip.

As described above, anchor lanes may be used for compositing (e.g., removing portions of one video and showing a different video in those portions), B-roll cuts (i.e., cutting away from the primary video to a different video whose clip is in the anchor lane), audio clips, or other composite presentation technique. In compositing cases, the anchored clips may overlay, be superimposed on, or be mixed with the portion of the media clip(s) in the spine, which the anchored clips span. In cases of B-roll cuts, the content of the anchored clips will be the content of the portion of the media presentation, which the anchored clips span. That is, the media clips in the spine that span the same portion of the media presentation will not be played back when the media presentation is played back.

In some embodiments, the media-editing application determines the point at which the content of the anchored media clip starts to affect the media presentation based on the position of the anchor relative to the anchored media clip and the media clip to which the anchored media clip is anchored. For instance, in cases of B-roll cuts, the content of the anchored media clip starts cut away from the media clips in the spine at the position of the anchor that connects the anchored media clip with the media clip to which the anchored media clip is anchored.

In the first stage 205, a media clip 250 has been selected from the clip browser 215. The selection is received through a user selection input 255 such as input received from a cursor controller (e.g., a mouse, touchpad, trackpad, etc.), from a touchscreen (e.g., a user touching a UI item on a touchscreen), etc.

In the second stage 210, a user has dragged the media clip 250 from the clip browser 215 and dropped it (by releasing the mouse button, "tap" of a touchscreen, etc.) in the anchor lane 240 above the central compositing lane 230 and before the anchored media clip 260 in the timeline 225. The media-editing application anchors the media clip 250 to the media clip 265.

B. Editing an Anchored Media Clip

Figure 3:
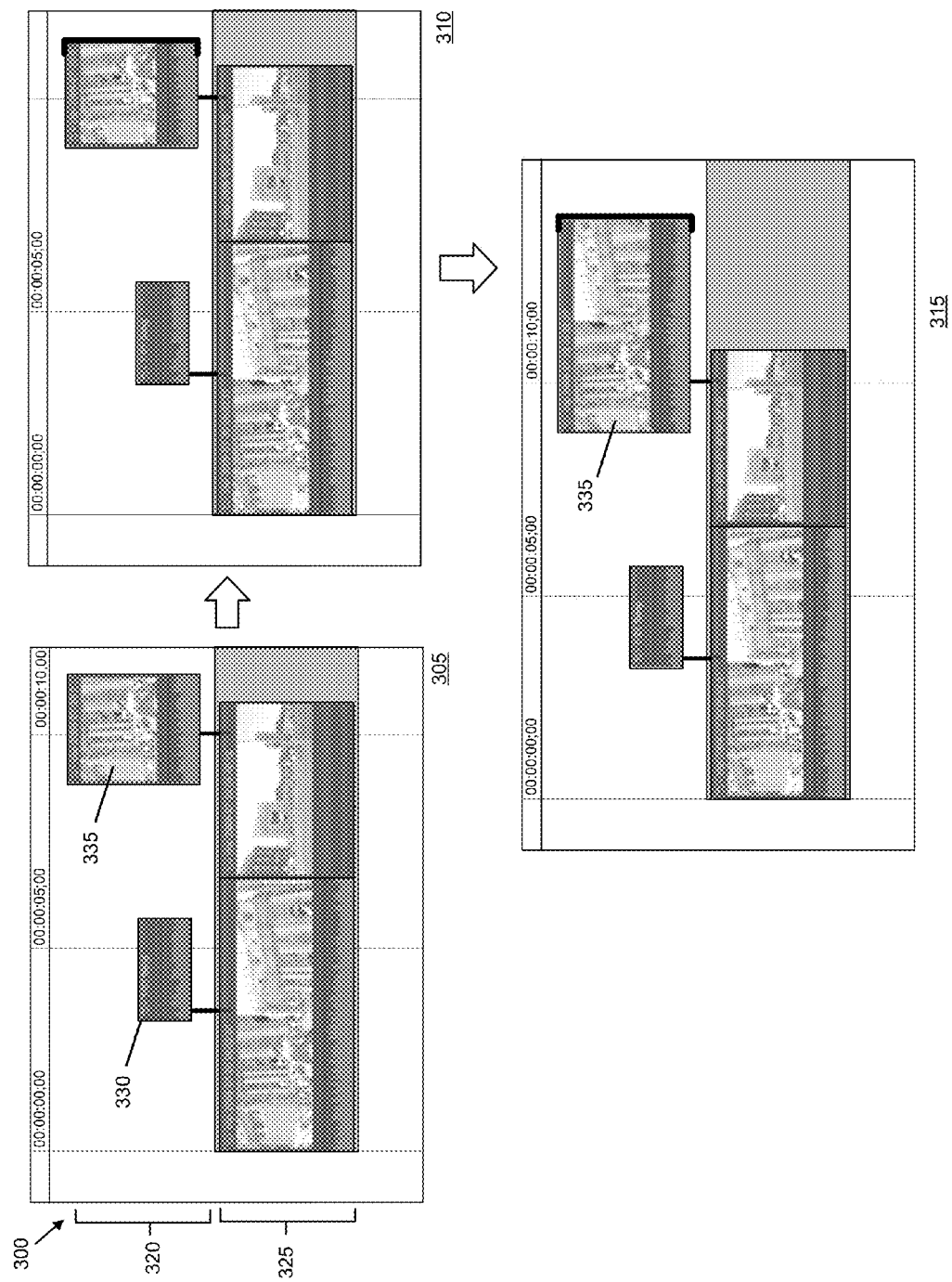
FIG. 3 illustrates an example of trimming an anchored clip in a timeline of a media-editing application.

FIG. 3 illustrates an example of trimming an anchored clip in a timeline 300 of a media-editing application. Specifically, this figure illustrates the timeline 300 in three different stages 305, 310, and 315 to show trimming an anchored clip 335 by pulling in the out-point of the anchored clip 335. The timeline 300 is similar to the timeline 115 described above by reference to FIG. 1.

Some embodiments allow the user of the application to trim a media clip in the timeline 300. The media-editing application of these embodiments allows the user to trim any media clip in any lanes of the timeline 300. That is, an anchored clip as well as a media clip in the central compositing lane 325 can be trimmed by the media-editing application. Different embodiments provide different ways of trimming a media clip from either end of the media clip. For instance, the media-editing application allows the user to drag either side edge of a media clip to pull in or push out the in- or out-point of the media clip.

In some embodiments, the media-editing application allows for sample accurate editing on anchored clips that are audio-only clips. That is, an audio-only clip in an anchor lane can be edited in single-sample precision. The media editing application in these embodiments allows for trimming or extending the audio-only clip in number of audio samples (e.g., trim the end of the clip by 100 audio samples of audio content sampled at 44.1 kilohertz). The media-editing application allows for sample accurate editing for a connected storyline (also referred to as a secondary compositing lane) and a compound clip when the connected storyline and the compound clip are anchored to media clips in the spine. Connected storylines and compound clips are described in detail further below.

In the first stage 305, the timeline 300 displays several media clips including a media clip 335. As shown, the media clip 335 is anchored to another media clip in the central compositing lane 325. In the second stage 310, the user has selected the right edge of the anchored media clip 335 in the anchor lane 320 by using a cursor (e.g., by clicking a mouse button, tapping a touchpad, or touching a touchscreen). The selection is illustrated in some embodiments by a bolding of the right border of the anchored media clip 335. In this example, the user selects the anchored media clip 335 that the user wishes to expand.

The third stage 315 illustrates that the user has dragged the right edge of the anchored media clips 335 to the right and released it (by releasing the mouse button, "tap" of a touchscreen, etc.).

C. Slipping a Media Clip

Figure 4:
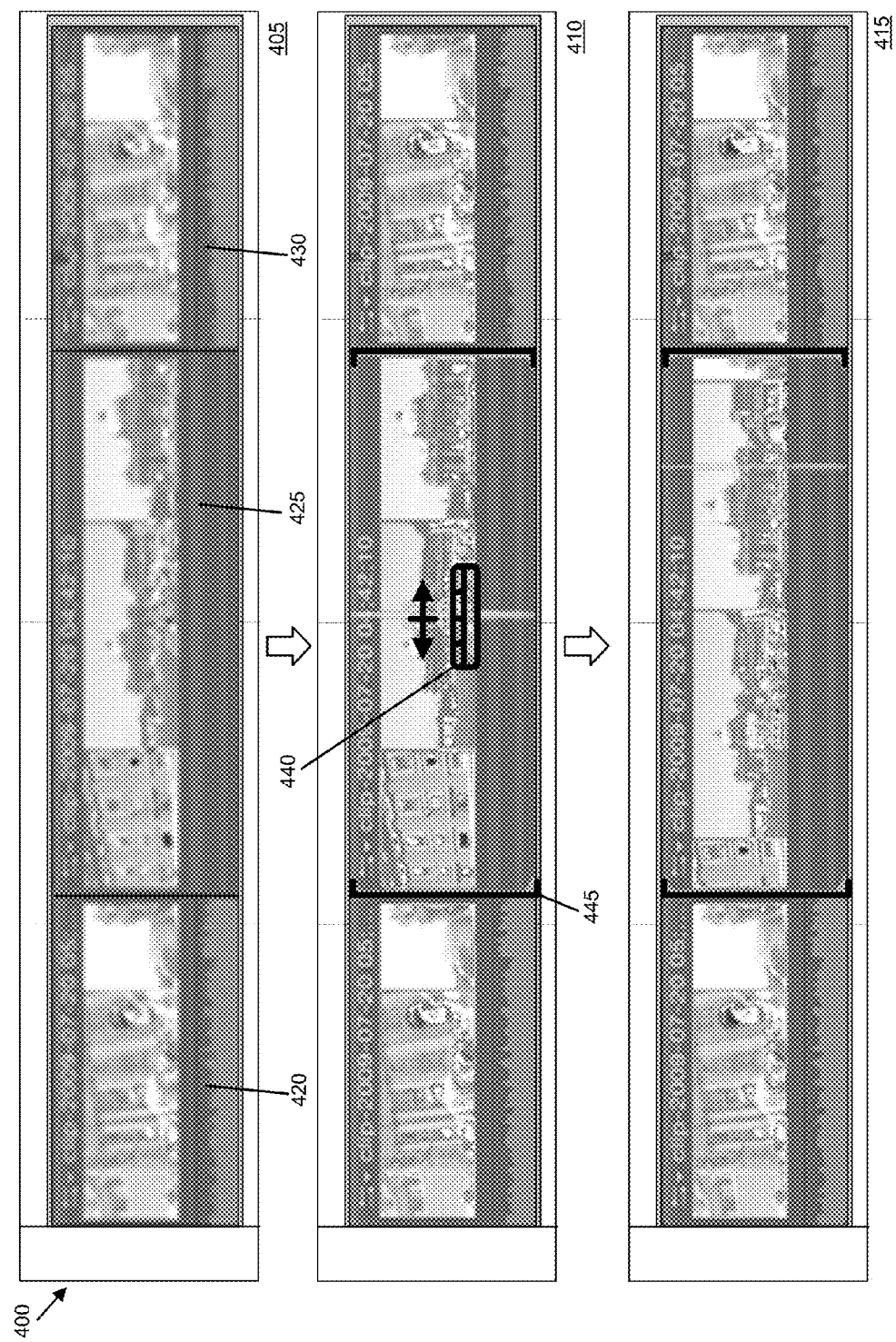
FIG. 4 illustrates an example of a slip operation performed on a media clip in a timeline of a media-editing application.

FIG. 4 illustrates an example of a slip operation performed on a media clip in a timeline 400 of a media-editing application. Specifically, this figure illustrates the timeline 400 in three different stages 405-415 to show the trimming and extending of the frames within a media clip 425 by scrolling thumbnails inside the media clip 425. The timeline 400 is similar to the timeline 115 described above by reference to FIG. 1.

In some embodiments, the media-editing application allows a user of the application to trim frames off one end of a media clip while extending the same number of frames on the other end of the media clip. In this manner, some embodiments retain the media clip's duration and position within the timeline 400 while the frames of the media clip are trimmed off one end and extended on the other end of the clip.

As mentioned above, each of media clips in some embodiments has a source media clip from which the media clip is taken. The source media clip may include additional media content (e.g., frames) before an in-point and after an out-point of a media clip. The media-editing application of some embodiments allows the user to change both in- and out-points of a media clip at the same by moving both in- and out-points by the same number of frames in one direction along the source media clip. Such change of both in- and out-points is referred to as a slip edit or a slip operation. Some embodiments allow the user to perform slip edit on a media clip displayed in the timeline 400.

The first stage 405 shows the timeline 400 before the user performs the slip operation on the media clip 425. As shown, the timeline 400 displays the three clips 420-430 in the central compositing lane 435. The second stage 410 illustrates the initiation of the slip operation on the media clip 425 in the timeline 400. The user of the media-editing application may initiate the slip operation by making a selection from a pull-down menu, by performing a keystroke, by performing a cursor controller operation (e.g., through a click operation), by selecting an item on the screen, etc. In some embodiments, the appearance of the slip symbol 440 indicates the initiation of the slip operation. Some embodiments indicate the initiation of the slip operation by displaying the slip symbol, the playhead in the same location as the slip symbol, and the highlighted brackets around the media clip.

The third stage 415 illustrates frames trimmed off one edge of the media clip and extended on the other edge as the user of the media-editing application scrolls the thumbnails by dragging the slip symbol 440. As shown, the middle thumbnail has moved slightly to the left to show that the in-point of the media clip 425 is pulled in while the out-point of the clip is pushed out. The third thumbnail is showing a full frame to indicate that more frames are added to the end of the media clip 425.

In some embodiments, the user of the media-editing application may move the slip symbol 440 to the left to trim frames off the left edge of the media clip while extending frames on the right edge of the media clip. The user may determine the number of frames to trim/extend for one media clip by sliding the slip symbol to the left and/or right, by inputting a numerical value (e.g., +5 or −5), by keystroke, by selecting selectable items on the screen, etc.

D. Anchor Position

As described above, the media content of an anchored media clip in some cases is composited with (e.g., overlay, superimpose, mix, etc.) with the content of the media clip that the anchored media clip is anchored to. The content of the anchored clip that is composited starts at the position of the anchor. Some embodiments place an anchor at the beginning (i.e., the in-point) of the anchored clip. Some such embodiments allow the user of a media-editing application to change the anchor's position with respect to the anchored clip that it is attached to.

Figure 5:
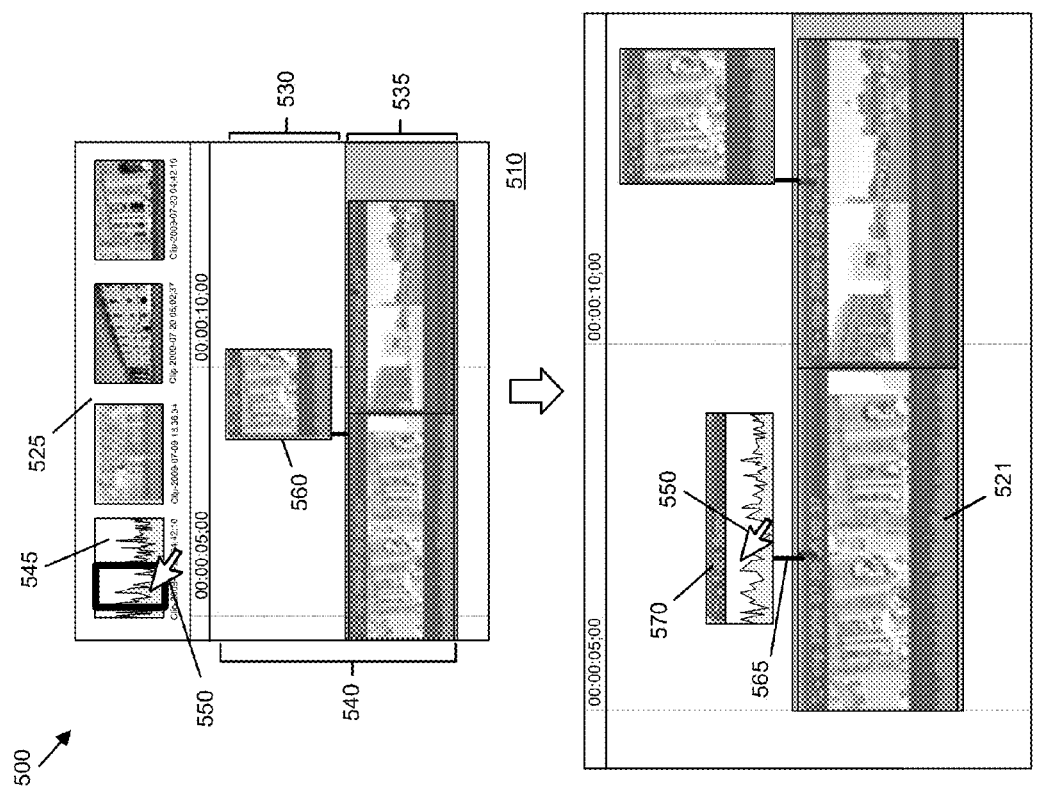
FIG. 5 illustrates an example of adding a portion of a media clip from a clip browser to a timeline of a media-editing application.

FIG. 5 illustrates an example of adding a portion of a media clip from a clip browser to a timeline of a media-editing application. Specifically, this figure illustrates a GUI 500 in two different stages 510 and 520 to show that the cursor position along the length of a media clip selected from a clip browser 525 becomes the position of anchor of the media clip when the media clip is brought into a timeline 500 and anchored to a media clip. The GUI 500 is similar to the GUI 100 described above by reference to FIG. 1.

As described above, the media-editing application of some embodiments allows a user of the application to select a media clip or a range within a media clip from a clip browser and anchor the selected media clip or the range to another media clip displayed in a timeline. In some embodiments, the media-editing application attaches an anchor to the beginning (i.e., the in-point) of the media clip when the media clip is anchored to another media clip in the timeline 500. In some such embodiments, the media-editing application also allows the user to attach an anchor to a media clip other than to the beginning of the media clip when the media clip is anchored to another media clip in the timeline 500. For instance, the media-editing application allows the user to select and drag a media clip by placing a cursor on the media clip. The position of the cursor along the length of the media clip becomes the position of the anchor of the media clip when the media clip is anchored to another media clip.

The operation of the GUI 500 will now be described by reference to the two stages 510 and 520 that are illustrated in FIG. 5. In the first stage 510, the user selects a range of the audio clip 545 from the clip browser 525. The selection is illustrated by a bolding of the border of that particular range of the media clip 545. The user selects the particular range of the media clip 545 as the range of the media clip that the user wishes to move to the anchor lane as an anchored media clip. The user places a cursor 550 to a particular position along the length of the range.

At stage 520, the user has dragged the media clip 545 from the clip browser 525 and dropped it (e.g., by releasing the mouse button, by tapping a touchscreen, etc.) in the anchor lane 540 above the central compositing lane 535 and before the anchored media clip 560 in the timeline 530. As the selected range is brought into the timeline, its length scales appropriately depending on the zoom level of the timeline. The media-editing application keeps the cursor's relative position within the range along the scaled length. As the selected range is anchored to the media clip 521 as a media clip 522, the media-editing application adds the anchor 565 to the media clip 522 at the position along the length of the media clip 522 where the cursor 550 is positioned.

Figure 6:
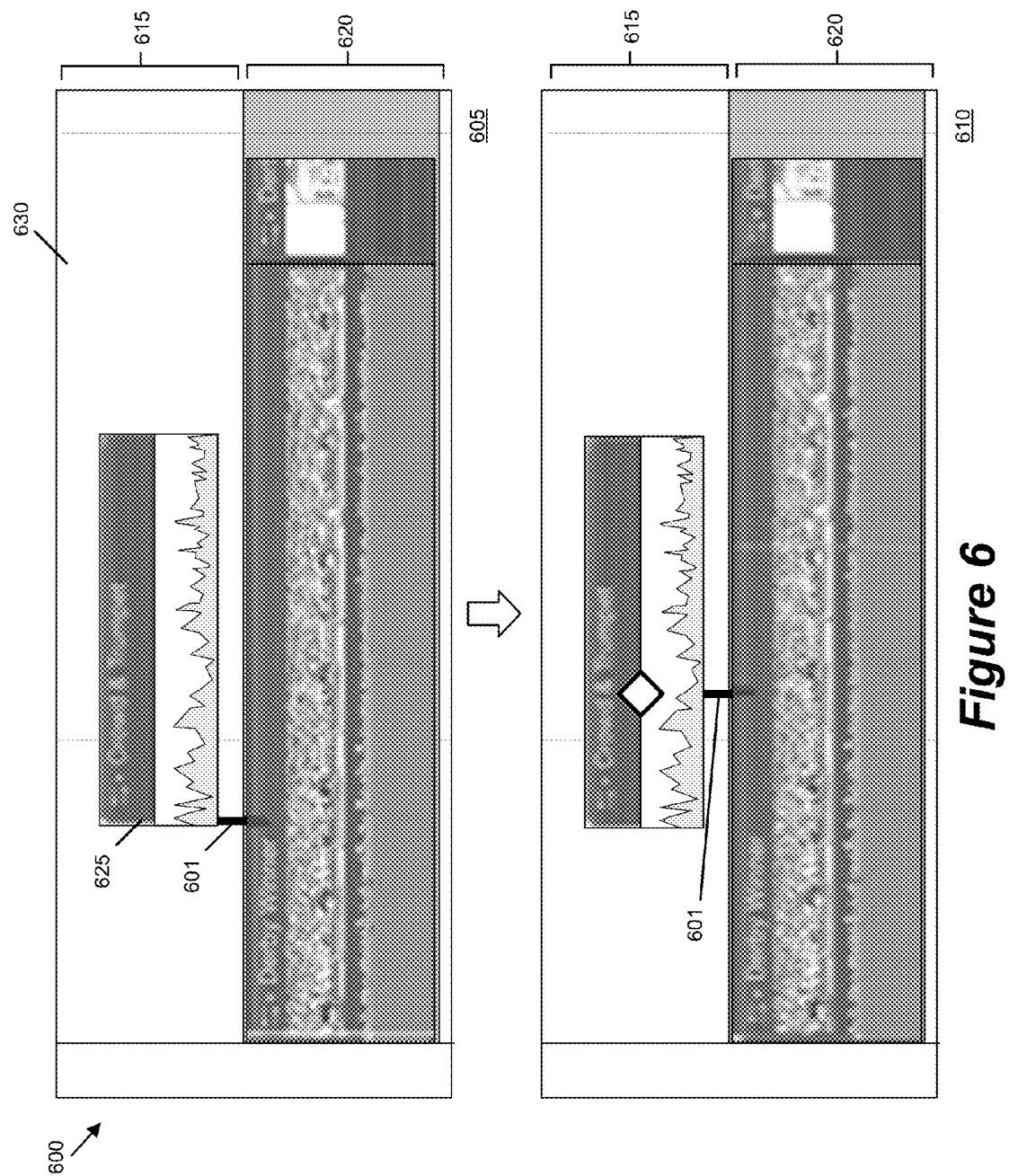
FIG. 6 illustrates an example of moving the anchor with respect to the anchored clip that it is attached to in a timeline of a media-editing application.

FIG. 6 illustrates an example of moving the anchor with respect to the anchored clip that it is attached to in a timeline of a media-editing application. Specifically, this figure illustrates the timeline 600 in two different stages 605 and 610 to show changing the position of an anchor with respect to the anchored clip, to which the anchor is attached. The timeline 600 is similar to the timeline 115 described above by reference to FIG. 1.

As described above, the position of the anchor along the length of the anchored clip specifies the start of the clip's media content that will be composited into the media content of the media clip to which the anchored clip is anchored. The media-editing application of some embodiments allows the user to change the position of an anchor with respect to an anchored clip, to which the anchor is attached.

The operation of the timeline 600 will now be described by reference to the two stages 605 and 610 that are illustrated in FIG. 6. In the first stage 605, the media-editing application displays the anchored media clip 625 in the anchor lane 615 with its anchor 630 positioned at the beginning (i.e., the in-point) of it.

In the second stage 610, the user has selected the anchor 601 by using a cursor (e.g., by clicking a mouse button, tapping a touchpad, or touching a touchscreen) and dragged and released (by releasing the mouse button, "tap" of a touchscreen, etc.) the anchor towards right and closer to the middle of the anchored media clip. As illustrated in FIG. 6, the anchored media clip in the anchor lane and the clips in the central compositing lane are at the same position in both stages 605 and 610 and only the anchor 601 has been moved by a user with respect to its corresponding anchored media clip.

E. Numeric Editing

Some embodiments of the media-editing application allow a user to edit media clips displayed in a timeline using numeric editing. Numeric editing allows the user of the media-editing application to make numerical inputs regarding the position of a media clip, playhead, or other items in the timeline. In some embodiments, the media-editing application allows a user to perform numeric editing to precisely specify the duration of a media clip, accurately specify the starting and/or ending point of a media clip in the timeline, specify the location of a playhead, etc. This functionality provides accuracy for the user when the user is editing the composite presentation.

Figure 7:
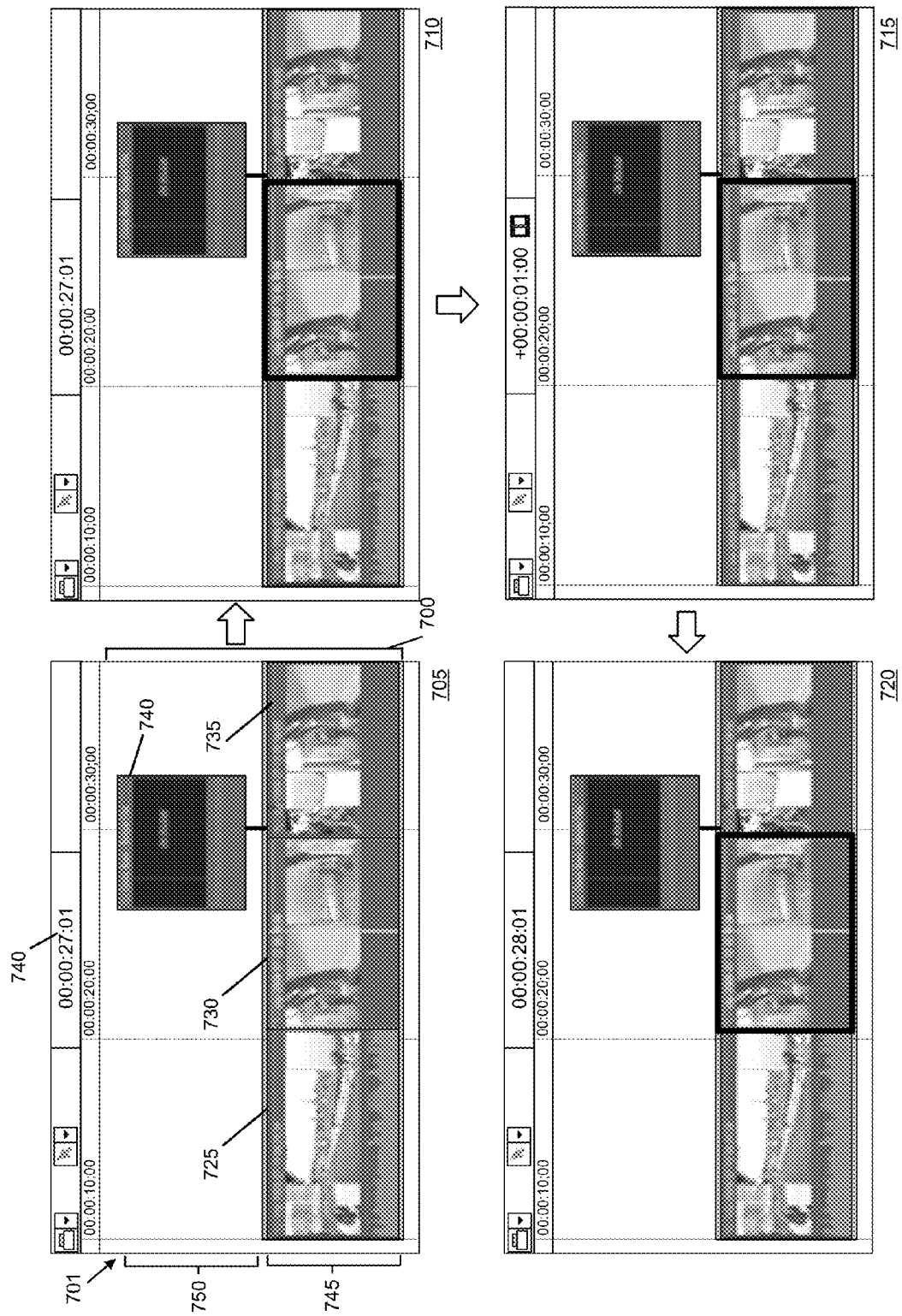
FIG. 7 illustrates an example of the sliding of media clips displayed in the timeline of a media-editing application through numeric editing.

FIG. 7 illustrates an example of the sliding of media clips displayed in the timeline 700 of a media-editing application through numeric editing. Specifically, this figure illustrates the GUI 701 in four different stages 705-720 the sliding of a media clips 730 displayed in a timeline 700 by incrementing the position value of the media clip 730 displayed in the timeline 700.

The media-editing application of some embodiments allows a user of the application to slide media clips displayed in a timeline through numeric editing. By sliding a media clip, the media-editing application extends or trims the media clips that come before or after the media clip being slid. That is, when a second media clip that comes after the first media clip and before the third media clip is slid to the right, the media-editing application extends the first media clip and trims the third media clip by the duration by which the slid media clip has moved. Conversely, when the second media clip is slid to the left in the timeline 700, the media-editing application trims the first media clip and extends the third media clip. The overall duration of the three media clips do not change as long as the second media clip does not go beyond the in-point of the first media clip or out-point of the third media clip.

As described above, each media clip displayed in the timeline 700 has a position within the timeline that may be represented by a numerical value. The media-editing application allows the user to move the position of a media clip in the timeline by incrementing or decrementing the numerical value representing the position of the media clip.

The first stage 705 shows the timeline 700 before the user performs a slide operation through the numeric editing of the positional value of a media clip. As shown, the central compositing lane 745 of the timeline 700 displays a composite presentation of media clips 725 735. The anchor lane 750 of the timeline 700 displays an anchored media clip 740.

The second stage 710 illustrates the selection of a media clip displayed in the timeline 700. In some embodiments, the user of the media-editing application selects a media clip through a cursor controller operation (e.g., clicking on a media clip), through a keystroke, through a numerical selection (e.g., inputting a value that is occupied by a media clip or inputting a range of values), etc. As mentioned above, the user may select a range within the timeline 700 (e.g., a portion of one or more media clips) instead of one or more entire media clips. As shown, the thick border around the media clip 730 indicates the user's selection of the media clip 730.

The third stage 715 illustrates an input by the user indicating the amount that the user would like to shift the position of the selected media clip in the timeline 700. The user inputs a numeric entry of +1:00. The media-editing application increments the position of the media clip 730 by a minute in the timeline 701. That is, the media-editing application moves the media clip 730 by a minute to the right.

The fourth stage 720 illustrates that upon completion of the slide operation, the media clip 730 displayed in the timeline 700 is shifted by the amount indicated by the numeric entry. As shown in this example, the media clip 725 is extended by one minute at the clips end and the media clip 735 is trimmed by one minute at the clips beginning F. Edits with Anchor Override As explained above by reference to FIG. 1, clips can be anchored to other clips in some embodiments. When a particular clip is moved in a timeline, any clips anchored to the particular clip are moved along with it. In some embodiments, the media-editing application provides a feature that allows a user to move the particular clip within the timeline while maintaining the position of (i.e., without moving) any clips (and the clips' anchor points), with respect to the media presentation, that were anchored to the particular clip.

Figure 8:
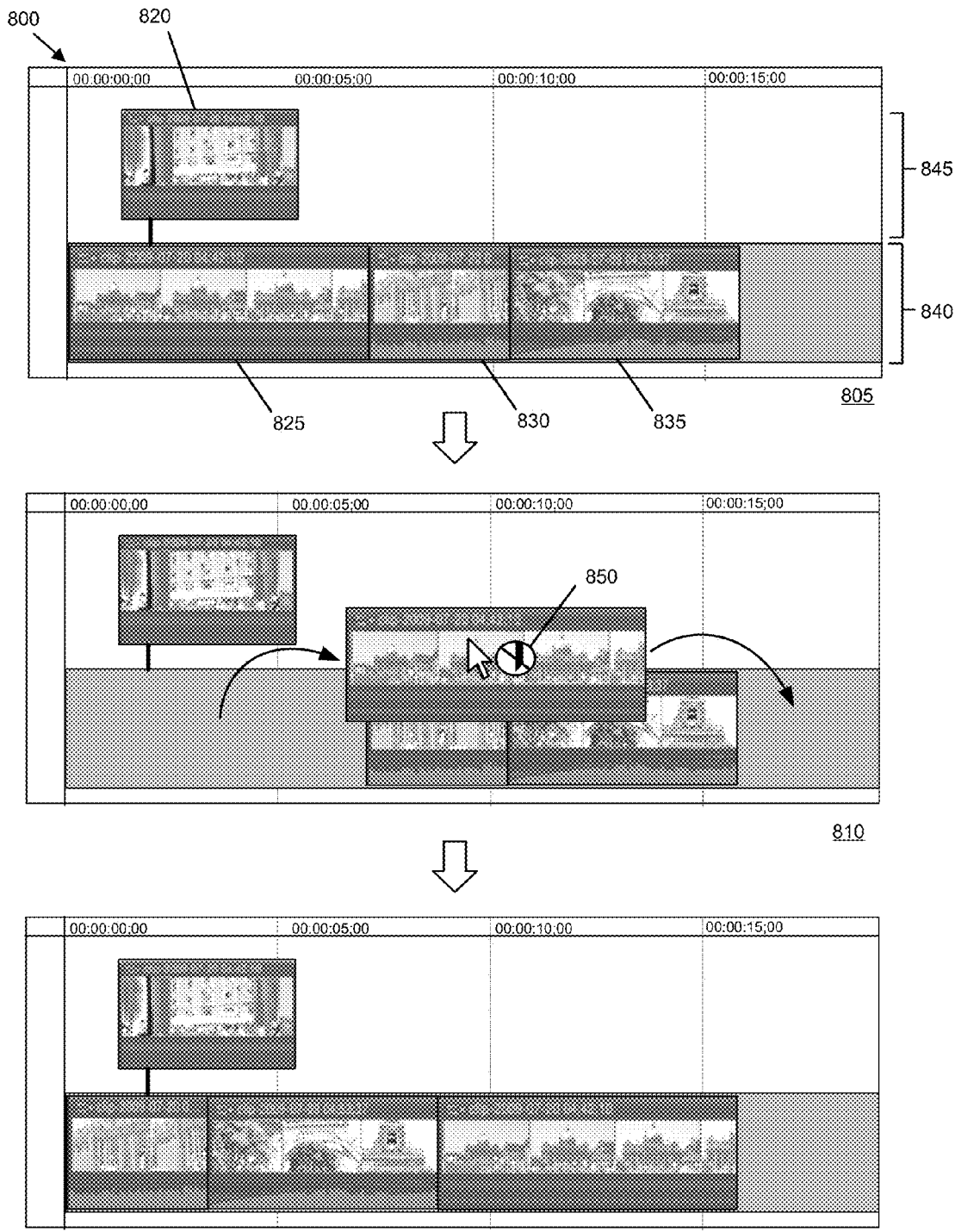
FIG. 8 conceptually illustrates an example of moving a clip within a timeline using an anchor override feature provided by the media-editing application of some embodiments.

FIG. 8 conceptually illustrates an example of moving a clip 825 within a timeline 800 using an anchor override feature provided by the media-editing application of some embodiments. Specifically, FIG. 8 illustrates the timeline 800 at three different stages 805-815 of moving the clip 825 along a spine 840 using the anchor override feature. In some embodiments, the timeline 800 is similar to the timeline 115 described above by reference to FIG. 1.

The first stage 805 shows the timeline 800 with three clips 825-835 positioned along the spine 840. In addition, the first stage 805 shows a clip 820 positioned along an anchor lane 845 and anchored to the clip 825.

The second stage 810 illustrates the timeline 800 after a user has started to move the clip 825 with the anchor override activated. In this example, the user activated the anchor override feature by pressing and holding a key (e.g., a tilde key) on a keyboard. While the anchor override feature is activated, the user started to move the clip 825 by selecting and moving (e.g., by clicking-and-holding a mouse button and dragging the mouse, tapping a touchpad and dragging across the touchpad, or touching with a finger the adjustable UI control displayed on a touchscreen and dragging the finger across the touchscreen) the clip 825 from the left side of the timeline 800 towards the right side of the clip 835. As shown at the second stage 810, the user is moving the clip 825 without the clip 820 anchored to it even though the clip 820 was anchored to the clip 825 before the user began moving the clip 825.

The second stage 810 also illustrates that the media-editing application is displaying an indicator 850 to provide a visual indication to the user that the anchor override feature is activated. When the media-editing application of some embodiments receives a command to activate the anchor override feature (pressing and holding a key in this example), the media-editing application displays the indicator 850 at or near the location of the cursor.

The third stage 815 shows the timeline 800 after the user has finished moving the clip 825 within the timeline 800. As illustrated, the clip 830 is now at the beginning of the timeline 800 followed by the clip 835 and then the clip 825.

In some embodiments, upon the user completing the movement of a particular clip in the timeline with the anchor override activated, the media-editing application moves clips (and any other clips anchored to the clips) towards the left along the timeline while maintaining the position of clips, with respect to the media presentation, that were anchored to the particular clip in to order to fill the gap left by the particular clip. After filing the gap left by the particular clip, the media-editing application of some embodiments anchors the clips that were anchored to the particular clip at the same locations in the timeline as before the particular clip was moved. In other words, the media-editing application of some such embodiments maintains the positions of the clips that were anchored to the particular clip throughout the entire move operation of the particular clip with the anchor override activated and anchors the clips that were anchored to the particular clip to which ever clip or clips that end up underneath the clips that were anchored to the particular clip as a result of the move operation.

In this example, the media-editing application moved the clip 830 and 835 to fill the gap left by the movement of the clip 825. Additionally, the media-editing application maintained the position of the clip 820, with respect to the media presentation, while the clip 825 was moved and anchored the clip 820 on the clip 830 after the clip 830 was moved to the beginning of the timeline 800 to fill the gap left by the clip 825.

In some embodiments, when a slide edit is performed on a particular clip, any clips anchored to the particular clip slide along with the particular clip. The media-editing application of some embodiments provides an anchor override feature that allows a user to perform a slide edit on the particular clip while maintaining the position of (i.e., without moving) any clips (and the clips' anchor points), with respect to the media presentation, that were anchored to the particular clip.

Figure 9:
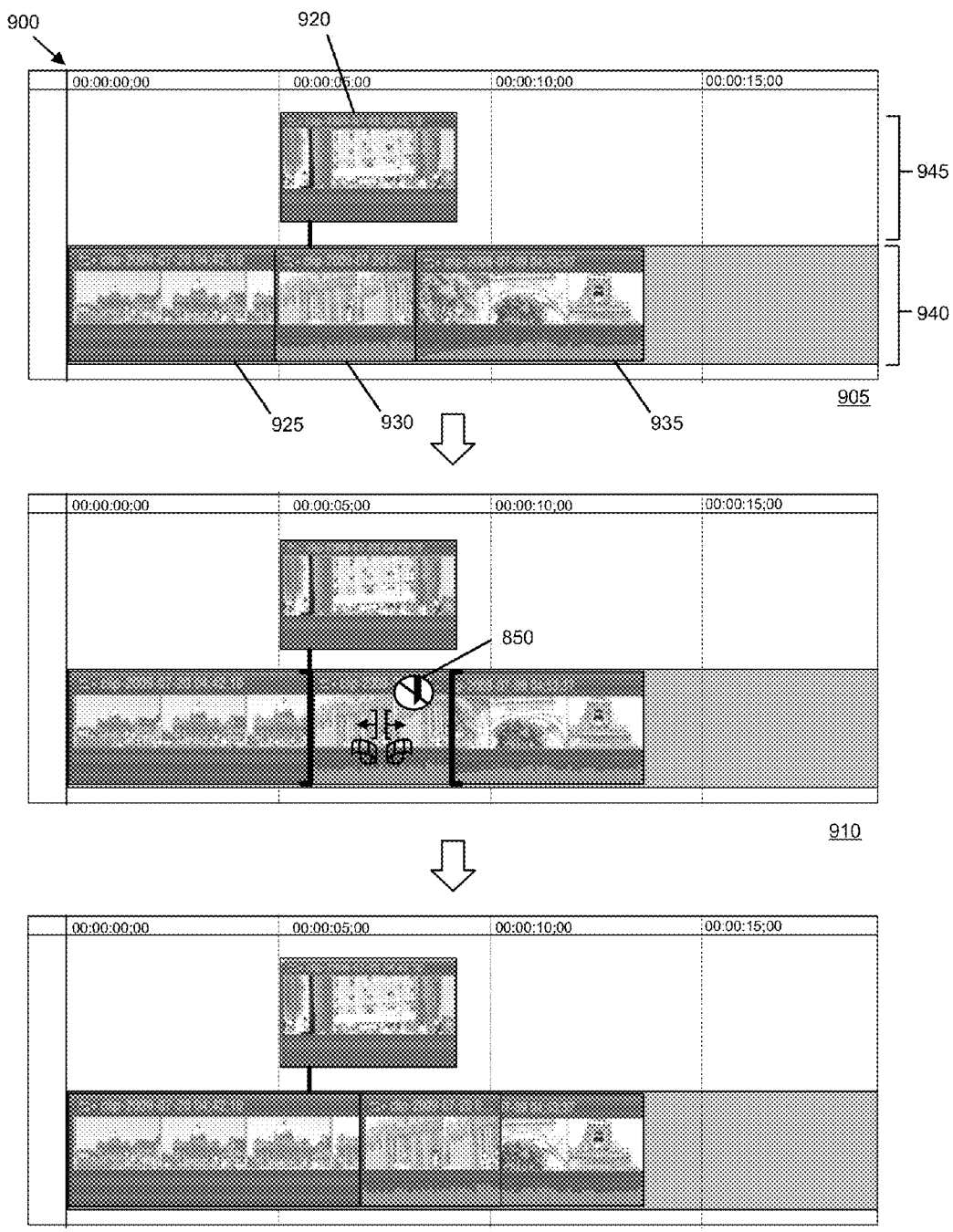
FIG. 9 conceptually illustrates an example of performing a slide edit on a clip using an anchor override feature provided by the media-editing application of some embodiments.

FIG. 9 conceptually illustrates an example of performing a slide edit on a clip 930 using an anchor override feature provided by the media-editing application of some embodiments. In particular, FIG. 9 illustrates a timeline 900 at three different stages 905-915 of sliding the clip 930 along a spine 940 using the anchor override feature. In some embodiments, the timeline 900 is similar to the timeline 115 described above by reference to FIG. 1.

The first stage 905 illustrates the timeline 900 with three clips 925-935 positioned along the spine 940. Additionally, the first stage 905 shows a clip 920 positioned along an anchor lane 945 and anchored to the clip 930.

The second stage 910 illustrates the timeline 900 after a user has started to perform a slide edit on the clip 930 with the anchor override activated. As described above by reference to FIG. 7, a slide edit operation performed on a particular media clip extends or trims media clips that come before and/or after the particular media clip (e.g., media clips adjacent to the particular media clip) on which the slide edit is performed while the particular media clip is moved along a timeline. This way, the overall duration of the media clips is maintained provided that the particular media clip does not move beyond the in-point of the media clip before or the out-point of the media clip after the particular media clip.

In this example, the user activated the anchor override feature by pressing and holding a key (e.g., a tilde key) on a keyboard. While the anchor override feature is activated, the user started to perform the slide edit on the clip 930 by pressing and holding another key (e.g., an option/alt key) on the keyboard and selecting and moving (e.g., by clicking-and-holding a mouse button and dragging the mouse, tapping a touchpad and dragging across the touchpad, or touching with a finger the adjustable UI control displayed on a touchscreen and dragging the finger across the touchscreen) the clip 930 along the spine 940 towards the right side of the timeline 900. The second stage 910 also shows that the user is sliding the clip 930 without the clip 920 anchored to it even though the clip 920 was anchored to the clip 930 before the user began sliding the clip 930.

In addition, the second stage 910 illustrates that the media-editing application is displaying the indicator 850 to provide a visual indication to the user that the anchor override feature is activated. When the media-editing application of some embodiments receives a command to activate the anchor override feature (pressing and holding a key in this example), the media-editing application displays the indicator 850 at or near the location of the cursor.

The third stage 915 shows the timeline 900 after the user has finished sliding the clip 930 along the spine 940 of the timeline 900. As illustrated, the clip 930 is positioned at a different location along the spine 940 with respect to the media presentation, and the in-point and out-point of the clip 930 remain the same. Additionally, the out-point of the clip 925 is extended the same amount that the in-point of the clip 935 is shortened as a result of the slide edit operation performed on the clip 930 in order to maintain the collective duration of the clips 925-935.

As described above, the media-editing application of some embodiments maintains the position of clips, with respect to the media presentation, that were anchored to a particular clip while a slide edit is performed on the particular clip with the anchor override activated. In some embodiments, when the user completes performing the slide edit on the particular clip, the media-editing application anchors the clips that were anchored to the particular clip at the same locations in the timeline as before the slide edit was performed on the particular clip. That is, the media-editing application of some such embodiments maintains the positions of the clips that were anchored to the particular clip throughout the entire slide edit operation on the particular clip with the anchor override activated and, at the end of the slide edit operation, anchors the clips that were anchored to the particular clip to which ever clip or clips that end up underneath the clips that were anchored to the particular clip.

For this example, the media-editing application maintained the position of the clip 920, with respect to the media presentation, while the slide edit was performed on the clip 930 to move the clip 930 along the spine 940 towards the right side of the timeline 900. The media-editing application then anchored the clip 920, which the media-editing application preserved at the same location through the three stages 905-915, on the clip 930 upon the completion of the slide edit operation on the clip 930.

When a slip edit is performed on a particular clip, any clips anchored to the particular clip move along with the frame at which the clip is anchored, in some embodiments. The media-editing application of some embodiments provides an anchor override feature that allows a user to perform a slip edit on the particular clip while maintaining the position of (i.e., without moving) any clips (and the clips' anchor points), with respect to the media presentation, that were anchored to the particular clip.

Figure 10:
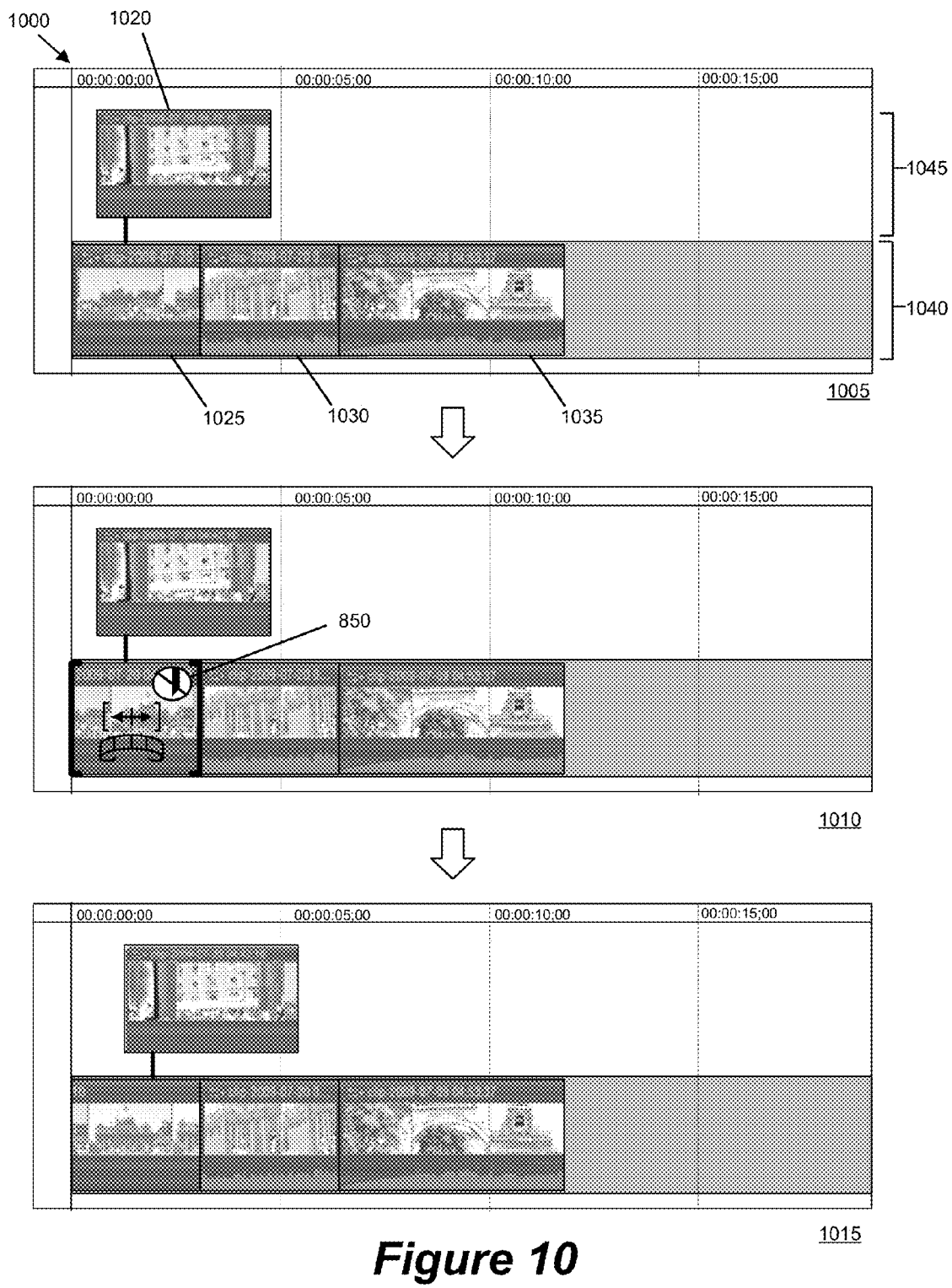
FIG. 10 conceptually illustrates an example of performing a slip edit on a clip within a timeline using an anchor override feature provided by the media-editing application of some embodiments.

FIG. 10 conceptually illustrates an example of performing a slip edit on a clip within a timeline using an anchor override feature provided by the media-editing application of some embodiments. Specifically, FIG. 10 illustrates the timeline 1000 at three different stages 1005-1015 of moving the frames displayed within the clip 1025 using the anchor override feature. In some embodiments, the timeline 1000 is similar to the timeline 115 described above by reference to FIG. 1.

The first stage 1005 shows the timeline 1000 with three clips 1025-1035 positioned along the spine 1040. The first stage 1005 also illustrates a clip 1020 positioned along an anchor lane 1045 and anchored to the clip 1025.

The second stage 1010 illustrates the timeline 1000 after a user has started to perform a slip edit on the clip 1030 with the anchor override activated. As explained above by reference to FIG. 4, a slip edit operation performed on a media clip trims frames off one end of the media clip while extending the same number of frames on the other end of the media clip (provided the media clip's source media clip contains sufficient frames before and after the media clip's in-point and out-point) in order to retain the media clip's duration and position within the timeline.

For this example, the user activated the anchor override feature by pressing and holding a key (e.g., a tilde key) on a keyboard. While the anchor override feature is activated, the user started to perform the slip edit on the clip 1025 selecting and moving (e.g., by clicking-and-holding a mouse button and dragging the mouse, tapping a touchpad and dragging across the touchpad, or touching with a finger the adjustable UI control displayed on a touchscreen and dragging the finger across the touchscreen) the frames displayed within the clip 1025 towards the right side of the clip 1025. As shown, the second stage 1010 illustrates that the user is slipping the clip 1025 without the clip 1020 anchored to it (as opposed to moving with the frames in the clip 1025) even though the clip 1020 was anchored to the clip 1025 before the user began slipping the clip 1025.

The second stage 1010 also shows that the media-editing application is displaying the indicator 850 to provide a visual indication to the user that the anchor override feature is activated. When the media-editing application receives a command to activate the anchor override feature (pressing and holding a key in this example), the media-editing application of some embodiments displays the indicator 850 at or near the location of the cursor.

The third stage 1015 illustrates the timeline 1000 after the user has finished the slip edit operation on the clip 1025. As shown, the clip 1025 is positioned at the same location along the spine 1040 with respect to the media presentation as that illustrated in the first and second stages 1005 and 1010. Additionally, a set of frames are displayed within the clip 1025 that are different from the set illustrated within clip 1025 in the first stage 1005 in order to indicate that the clip 1025's in-point and out-point are have changed.

As mentioned above, in some embodiments, the media-editing application maintains the position of clips, with respect to the media presentation, that were anchored to a particular clip while a slip edit is performed on the particular clip with the anchor override activated. When the user finishes performing the slip edit on the particular clip, the media-editing application of some embodiments anchors the clips that were anchored to the particular clip at the same locations in the timeline as before the slip edit was performed on the particular clip. In other words, in some such embodiments, the media-editing application maintains the positions of the clips that were anchored to the particular clip throughout the entire slip edit operation on the particular clip with the anchor override activated and, at the end of the slip edit operation, anchors the clips that were anchored to the particular clip to which ever clip or clips that end up underneath the clips that were anchored to the particular clip.

In this example, the media-editing application maintained the position of the clip 1020, with respect to the media presentation, while the slip edit was performed on the clip 1025 to move frames displayed within the clip 1025 towards the right side of the clip 1025. Then the media-editing application anchored the clip 1020, which the media-editing application kept at the same location through the three stages 1005-1015, on the clip 1025 when the slip edit operation on the clip 1025 finished.

While FIGS. 8-10 illustrate activating an anchor override feature when editing a clip by holding and pressing a key on a keyboard, the media-editing application of different embodiments utilize additional and/or different ways to allow a user to activate the anchor override feature. For instance, in some embodiments, the user can activate the anchor override feature through a different key, a series of keystrokes, or a combination of keystrokes, an option from a pull-down menu or a pop-up menu, etc. The media-editing application of some embodiments allows the user to define the command (e.g., through a settings panel) to activate the anchor override feature.

Figure 11:
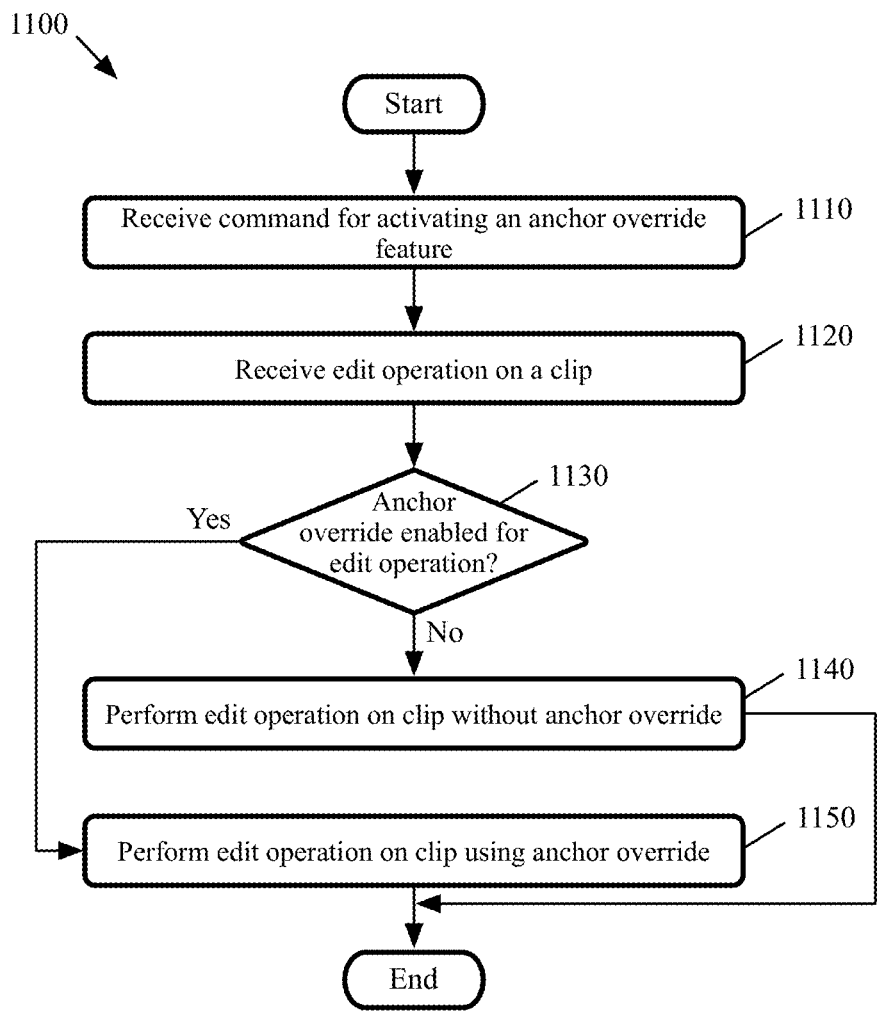
FIG. 11 conceptually illustrates a process of some embodiments for editing a clip with an anchor override activated.

FIG. 11 conceptually illustrates a process 1100 of some embodiments for editing a clip with an anchor override activated. In some embodiments, the media-editing application described above by reference to FIGS. 1-10 performs the process 1100 to determine whether to edit a clip or set of clips with an anchor override feature.

The process 1100 starts by receiving (at 1110) a command for activating an anchor override feature. As discussed above, different embodiments define different commands for activating an anchor override features. For instance, in some embodiments, an anchor override is defined to be activated by pressing and holding a key (e.g., a tilde key), a combination of keys, etc.

As explained above by reference to FIGS. 8-10, the media-editing application of some embodiments displays an indicator to provide a user with a visual indication that the anchor override feature is activated. In some embodiments, the process 1100 displays such an indicator when the media-editing application is in a state ready to perform an edit operation for which the anchor override operation is defined. For example, the process 1100 displays the indicator when the select tool of the media-editing application of some embodiments is activated. As another example, in some embodiments, the process 1100 displays the indicator when the media-editing application's trim tool is activated and the cursor is positioned over a clip. In some embodiments, the process 1100 displays the indicator only when the cursor is positioned over a clip with other clips anchored to it. By displaying the indicator when the media-editing application is in a particular state, the process 1100 provides the user with an indication of whether a particular edit operation has an anchor override feature. If so, the indication also provides the user with an indication of whether the anchor override feature is activated before the user decides to perform the particular edit to the clip.

Next, the process 1100 receives (at 1120) an edit operation on a clip. Examples of edit operations include a moving a clip, modifying the in-point and/or out-point of a clip, performing a slide edit on a clip, performing a slip edit on a clip, performing a rolling edit on a clip, performing a ripple edit on a clip, etc.

After receiving an edit operation, the process 1100 then determines (at 1130) whether the anchor override feature is enabled for the received edit operation. Different embodiments enable an anchor override feature for any number of different edit operations. For instance, in some embodiments, an anchor override feature is enabled for moving clips within the timeline, a slide edit operation, a slip edit operation, etc.

When the process 1100 determines that the anchor override feature is not defined for the received edit operation, the process 1100 performs (at 1140) the edit operation on the clip without the anchor override. That is, when the edit operation modifies the position of the clip's frames with respect to the media presentation, any clips anchored to the clip also move along with the clip while the anchored clips' positions relative to the clip are maintained (i.e., the frame at which each anchored clip is anchored is maintained). For instance, when a particular clip is moved to a different position in the media presentation, any clips anchored to the particular clip are moved along with the particular clip and the anchored clips' position relative to the particular clip are preserved. After performing the edit operation, the process 1100 ends.

When the process 1100 determines the anchor override feature is defined for the received edit operation, the process 1100 performs (at 1150) the edit operation on the clip using the anchor override feature. As described above by reference to FIGS. 8-10, when an edit operation is performed on a particular clip with an anchor override feature activated, the position of any clips anchored to the clip are maintained (i.e., not moved) with respect to the media presentation. In some embodiments, the process 1100 anchors the clips whose positions were maintained during the edit operation and updates the data structures of these clips to reflect the clips on which these anchored clips are now anchored. Details of updating the data structures of such clips are described below by reference to FIG. 21. Once the process 1100 performs the edit operation using the anchor override feature, the process 1100 then ends.

III. Data Structures

In some embodiments, the media-editing application is an application that enables a user to create a composite media presentation from a set of media files. Through a graphical user interface (GUI) of the application, the user specifies the manner in which the media files are composited to create the composite presentation. In addition, through this GUI, the user can command the application to import one or more media files (e.g., from a camera, from an external drive, from an internal drive, etc.). Upon instructions from the user (i.e., through the media-editing application GUI) or as an automatic response to the detection of the media files in an external storage, the application copies the media files to a particular media storage location on a particular storage device. Some embodiments create a particular folder within the folder structure of the storage device for a set of imported media files (i.e., the media files imported at a particular time) and store a copy of the imported files in this particular folder at time of import.

When importing a media file, some embodiments create a media clip data structure for the imported media that links to the media file, any transcoded versions of the media file, and any analysis data about the media file. This media clip is the entity that is added to a media presentation in some embodiments in order to include the media file (or a portion of the media file) in the composite presentation. Some embodiments store this information in an asset data structure that specifically references the media and analysis files, and then additionally create a clip data structure that references the asset. In addition, the asset data structure may include metadata such as a UUID for the media file generated by the camera that captured the media, file format information, various video properties (e.g., frame rate, colorspace, pixel transform, dimensions, etc.), and various audio properties (e.g., channel count, track count, sample rate, etc.) of the media.

The references stored in the media clip (or asset) refer to the versions of the media file stored in the application's file storage. Some embodiments, for each set of imported media files, create separate folders for the original media and any type of transcoded media. In some embodiments, the transcoded media include both high-resolution and low-resolution encodes of the original media file that may be created on import or post-import.

In some embodiments, these references to the files are pointers to the locations of the files on the storage device. In some embodiments, the media-editing application initially sets the reference to the original media such that the data structure references the media file that is to be imported (e.g., the file on a camera) as the original media, then modifies this reference once the media file is copied to the application's file storage so that the data structure now references the media in the file storage. In some such embodiments, the application displays the media clips for the user to edit before the file is actually copied. This enables a user to begin creating a presentation using the media clip while the clip refers to a file stored on a camera, and then continue using the same clip once the file is copied with no interruption to the editing workflow.

Much like the folders for different versions of media files, some embodiments create separate folders within a folder for a set of imported files for each type of analysis file (e.g., a folder for person detection files, a folder for color balance files, a folder for shake detection files, etc.). In addition, some embodiments store additional clip data in the media clip, as opposed to a separate file. As one example, some embodiments store shake detection as a tag about the media file or a specific portion of the media file.

Figure 12:
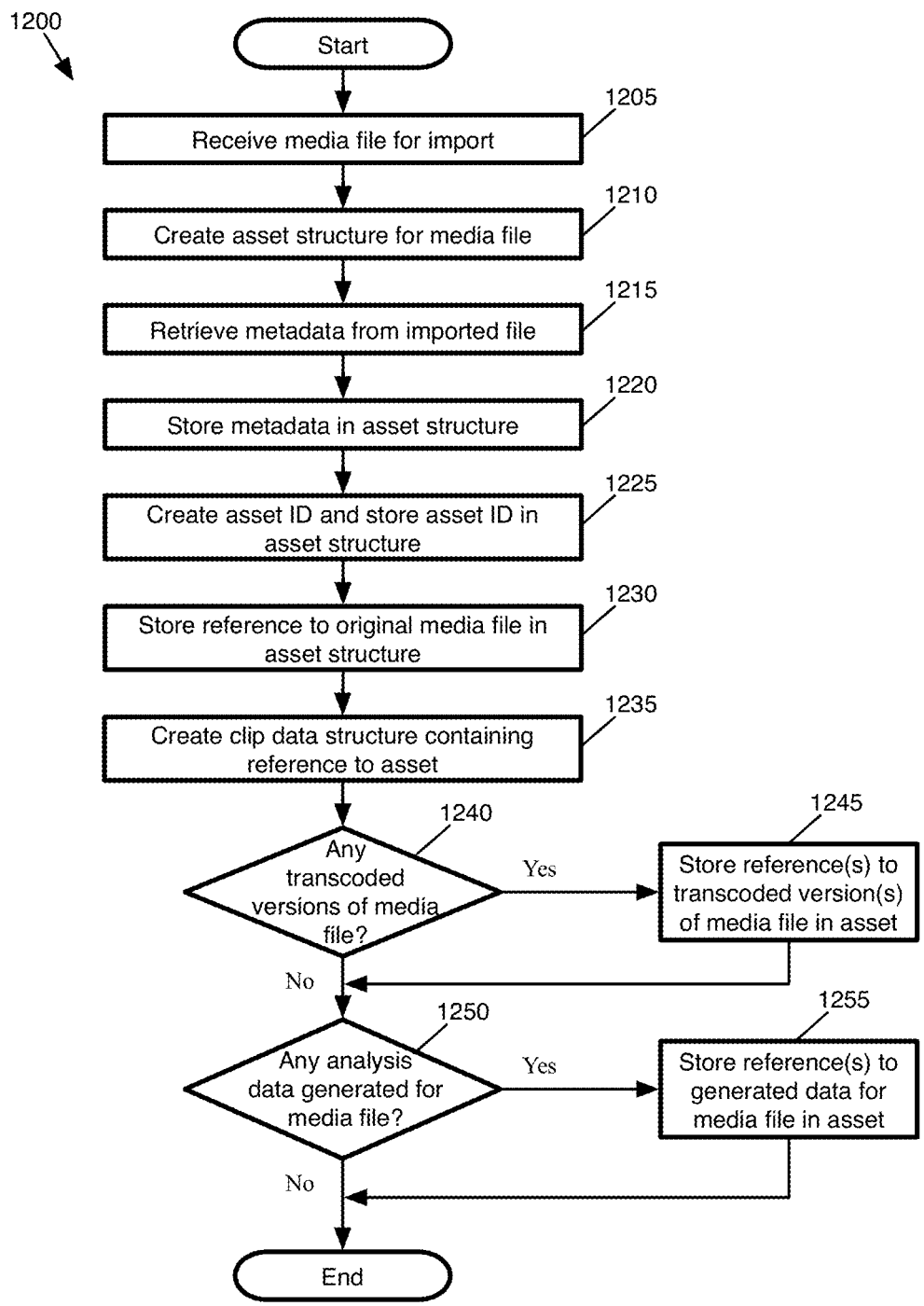
FIG. 12 conceptually illustrates a process of some embodiments for creating an asset data structure and a clip data structure referencing that asset.
Figure 13:
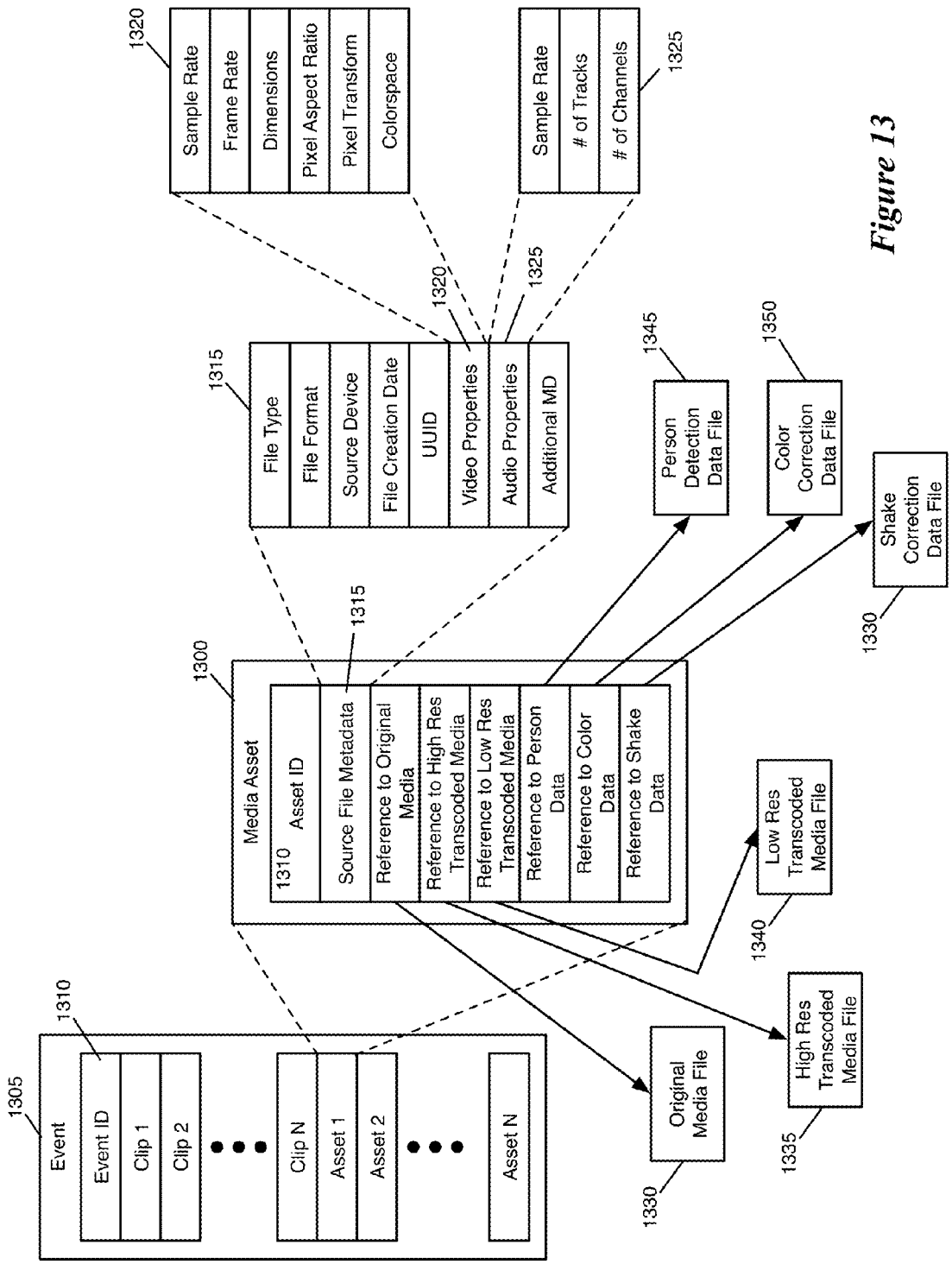
FIG. 13 conceptually illustrates an asset data structure for a video asset, as well as an event data structure for an event that contains the video asset.
Figure 15:
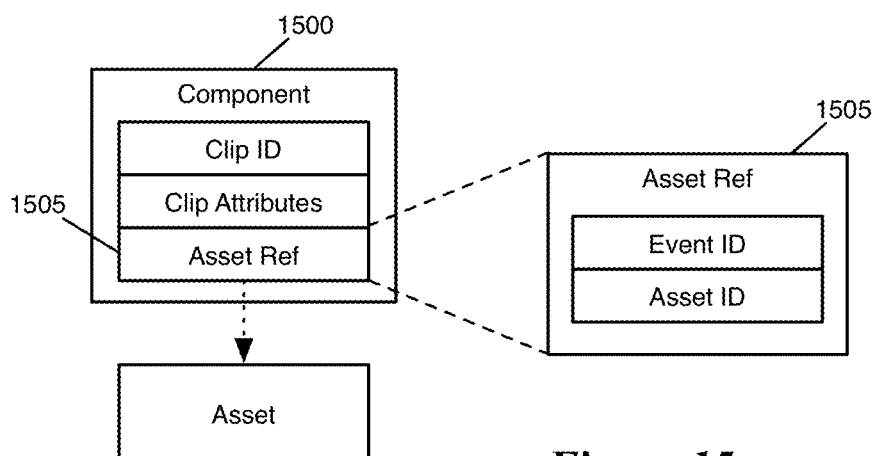
FIG. 15 conceptually illustrates a clip data structure that contains a single asset.

FIG. 12 conceptually illustrates a process 1200 of some embodiments for creating an asset data structure and a clip data structure referencing that asset. In some embodiments, process 1200 is performed as part of the import process of the media-editing application. The process 1200 will be described in part by reference to FIGS. 13 and 15. FIG. 13 conceptually illustrates an asset data structure 1300 for a video asset, as well as an event data structure 1305 for an event that contains the video asset. FIG. 15 conceptually illustrates a simplified clip data structure 1500 that contains a single asset.

As shown, the process begins by receiving (at 1205) a media file to import. The media file may be an audio file, a video file, or other type of media file. In the example shown in FIG. 13, the media file is a video file with audio channels (e.g., a ".mov" file).

Next, the process creates (at 1210) an asset data structure for the media file. At this point in the process, the asset data structure is an empty structure. Some embodiments define the data structure in a CoreData (SQLite) database file, an XML file (e.g., an XML file for an event), etc. As mentioned, FIG. 13 illustrates an asset data structure 1300 for the media asset. The asset data structure 1300 is fully populated, and this data will be described further below.

In some embodiments, the asset data structure is created within an event data structure. If the event data structure does not yet exist, then the media-editing application also creates this data structure to contain the asset. As shown in FIG. 13, the asset data structure 1300 is one asset within the event data structure 1305. The event data structure 1305 includes an event ID 1310, the list of assets, and a list of clips. The event data structure may include additional fields in some embodiments, such as the event name, event date (which may be derived from asset information), etc. The event data structure 1305 may be a CoreData (SQLite) database file that includes the assets and clips as objects defined with the file, an XML file that includes the assets and clips as objects defined with the file, etc.

The process next retrieves (at 1215) metadata from the imported file, and then stores (at 1220) this metadata in the asset structure. The metadata is information about the source file and its stored media in some embodiments. In some embodiments, this metadata is used to generate the asset ID, described below. The asset data structure 1300, as shown, includes source file metadata 1315. As shown, the source file metadata includes the file type (e.g., audio, video, movie, still image, etc.), the file format (e.g., ".mov", ".avi", etc.), the source device (i.e., the device that created the media, such as the particular type of camera on which a movie file was captured), the file creation date (e.g., the date a video was captured, rather than the date of import), a UUID (a unique identifier generated by a media creation device such as a camera), a set of video properties 1320, a set of audio properties 1325, and additional metadata. Different types (or manufacturers) of cameras create different UUIDs differently. These may be hashes of various data in some embodiments, such as a camera ID, record time (e.g., the time a user of the camera started recording, the duration of the video), etc., so long as no UUIDs will always be unique.

The video properties 1320 of some embodiments include such properties as a sample rate, a frame rate (i.e., the number of video images the video file contains per second, often 24, 25, or 30), the dimensions of the image (i.e., the number of pixels horizontally and number of rows of pixels), the pixel aspect ratio (i.e., the shape of the pixels, which may be square (HD video) or rectangular (e.g., NTSC video has a ratio of 10:11)), the pixel transform, and the colorspace in which pixel values of the image are defined (e.g., ITU-R BT.709 for HD, ITU-R BT.601 for SD, etc.). The audio properties 1325 of some embodiments include a sample rate (i.e., the number of audio samples per second, often 48 kHz), the number of audio tracks stored in the underlying media file, and the number of audio channels stored in the underlying media file. In some embodiments, the asset may additionally store override data that modifies one or more of the video or audio properties. For instance, a user might enter that a media file is actually 1080p, even though the file's metadata, stored in the asset, indicates that the video is 1080i. When presented to the user, or used within the application, the override will be used and the media file will be treated as 1080p.

Returning to FIG. 12, the process 1200 then creates (at 1225) an asset ID and stores the asset ID in the asset structure. The asset ID, in some embodiments, is a function of various properties of the underlying media file. For instance, some embodiments generate the asset ID as a hash of properties such as a file identifier, video properties, audio properties, and media range. The creation of the asset ID will be described in further detail by reference to FIG. 14. As shown in FIG. 13, the asset ID 1310 is stored in the video asset 1300.

With the asset created, the process 1200 then begins populating the asset with references to various data. The process stores (at 1230) a reference to the original media file in the asset structure. As described above, this reference initially refers to the media file on the device from which the application is importing the file (e.g., the camera), and then once the file is copied to the application's folder structure, the reference is modified to refer to the copied media file.

Next, the process 1200 creates (at 1235) a clip data structure containing a reference to the asset. In some embodiments, a clip is created for each asset. As will be described below, clip data structures (e.g., clip objects) can also contain other clips, and some embodiments use the same data structure for single asset clips, compound clips containing multiple assets and/or nested clips, and project sequences. The clip data structure, like the asset, is contained in the event data structure in some embodiments. Some embodiments create a series of nested clip objects for an imported clip, as described in further detail below. The lowest clip object in the nested hierarchy references the asset.

Next, the process determines (at 1240) whether any transcoded versions of the media are generated by the media-editing application. As described in subsections A and B above, some embodiments generate one or more transcoded versions of imported media files in formats that are better suited for editing. This may be an automatic process based on the imported file properties, or based on user selection of whether to transcode the media. When one or more transcoded versions of the media are created, the process stores (at 1245) references to any such transcoded versions of the media file in the asset data structure.

The process also determines (at 1250) whether any analysis data is generated for the media by the media-editing application. As described above, some embodiments generate data about the video and/or audio data of a media file. This data may be generated automatically or based on user selection of particular analysis operations. When one or more analysis data files are created, the process stores (at 1255) references to any such analysis data files in the asset data structures. The process 1200 then ends.

The media asset 1300 of FIG. 13 includes references to three versions of the underlying media file: a copy of the original media file 1330, a high resolution transcoded media file 1335, and a low resolution transcoded media file 1340. In addition, the media asset includes references to a person detection file 1345, a color correction data file 1350, and a shake correction data file 1355. These data files are described in further detail in the subsections above. In some embodiments, the references stored in the asset data structures are pointers to the locations of the video on a physical storage device (e.g., the boot disk of the device on which the media-editing application operates). In the case of media asset 1300, the underlying file stores both audio and video. In some media formats, different files are used to store video and audio for a single shot (and there may be multiple audio files recorded by different audio recorders in some cases). In this case, some embodiments create separate assets for each file. In some embodiments, each media file gets its own asset data structure.

Figure 14:
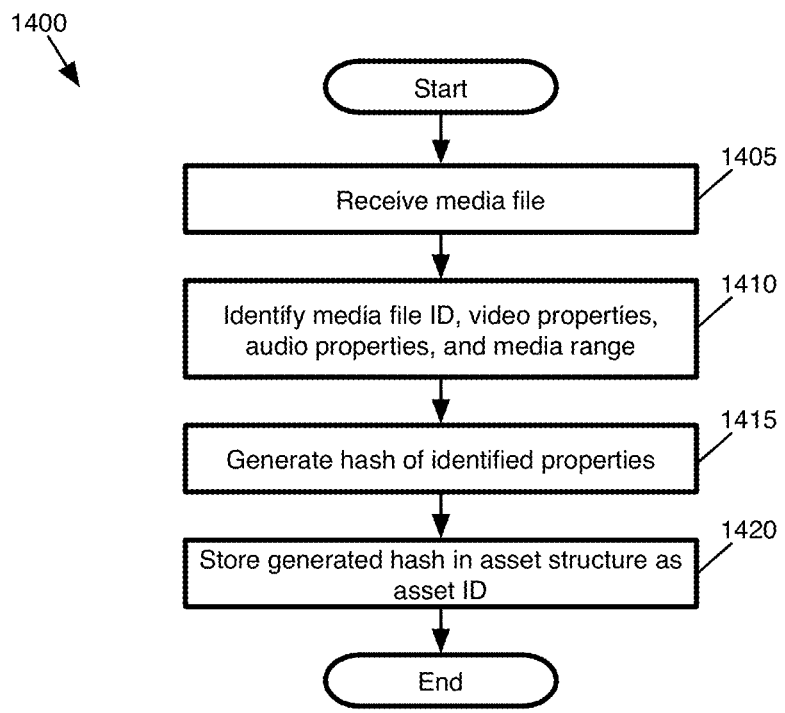
FIG. 14 conceptually illustrates a process of some embodiments for generating an asset ID and storing the ID in the data structure.

As mentioned in the discussion of FIG. 13, the asset ID for a particular asset may be generated using various properties of the asset's underlying media file. FIG. 14 conceptually illustrates a process 1400 of some embodiments for generating the asset ID and storing the ID in the data structure. In some embodiments, process 1400 is performed at operation 1225 of process 1200.

As shown, the process 1400 begins (at 1405) by receiving a media file (e.g., a video file, audio file, movie file, etc.). The process then identifies (at 1410) the media file ID, video properties, audio properties, and media range of the media file. As shown in FIG. 13, these may be stored as metadata of the source media file. The media file ID, in some embodiments, is a UUID generated by a camera that shot the media file, as described above. In some cases, the file may not have a UUID (e.g., if the device that captured the file does not generate UUIDs), and some embodiments will instead use the file name. The video properties used in some embodiments are the dimensions, colorspace, field dominance, sample duration, frame duration, pixel transform, and pixel aspect ratio, though different video properties may be used in different embodiments. The sample duration may be different from frame duration if, for example, the video is field rendered, in which case the frame duration is twice the sample duration. The frame duration, in some embodiments, is the inverse of the frame rate (e.g., if the frame rate is 30 fps, then the frame duration is 1/30 of a second). The audio properties used in some embodiments are the number of tracks, number of channels, and sample rate (i.e., the same as shown in audio properties 1325). Some embodiments include additional properties, such as the file creation date (i.e., the date and/or time at which the media was captured (e.g., filmed, photographed, recorded, etc.)).

The media range indicates the range of the original media file reference by the particular asset. Some embodiments use timecode values of the media file to define the media range. Thus, if a file is split apart (e.g., a user might take a thirty minute video and split it into a twelve minute video, a seven minute video, and an eleven minute video, as well as retain the original), the different timecodes will differentiate the assets. The media range can also be used if one of the assets goes missing, as an asset with identical properties and a range including the media range of the missing assets can be used to restore the missing asset.

The process then generates (at 1415) a hash of the identified properties of the media file. Different embodiments use different hash algorithms (e.g., MD5, etc.). The process then stores (at 1420) this generated hash in the asset structure as the asset ID. While the process 1400 describes one method of computing an asset ID, one of ordinary skill will recognize that asset IDs can be computed using many different properties and many different computation algorithms.

As mentioned above, some embodiments use a clip structure that references one or more assets when importing a media file. FIG. 15 illustrates a component clip data structure 1500 of some embodiments that references an asset. In some embodiments, the component clip 1500 is the lowest level of a set of nested clip objects that are all members of the same class. The details of clip objects of some embodiments will be described below by reference to FIG. 16.

The component clip 1500 includes a clip ID, clip attributes (described in more detail below), and an asset reference 1505. The asset reference 1505 of some embodiments stores an event ID and an asset ID, and uniquely identifies a particular asset data structure, as indicated by the dashed arrow referring to an asset. The arrow is shown as dashed because the asset reference is not a direct reference to the asset, but rather is used to locate the asset when needed. When the media-editing application of some embodiments needs to identify a particular asset, the application uses the event ID to locate the event that contains the asset, and then the asset ID to locate the particular desired asset.

Figure 16:
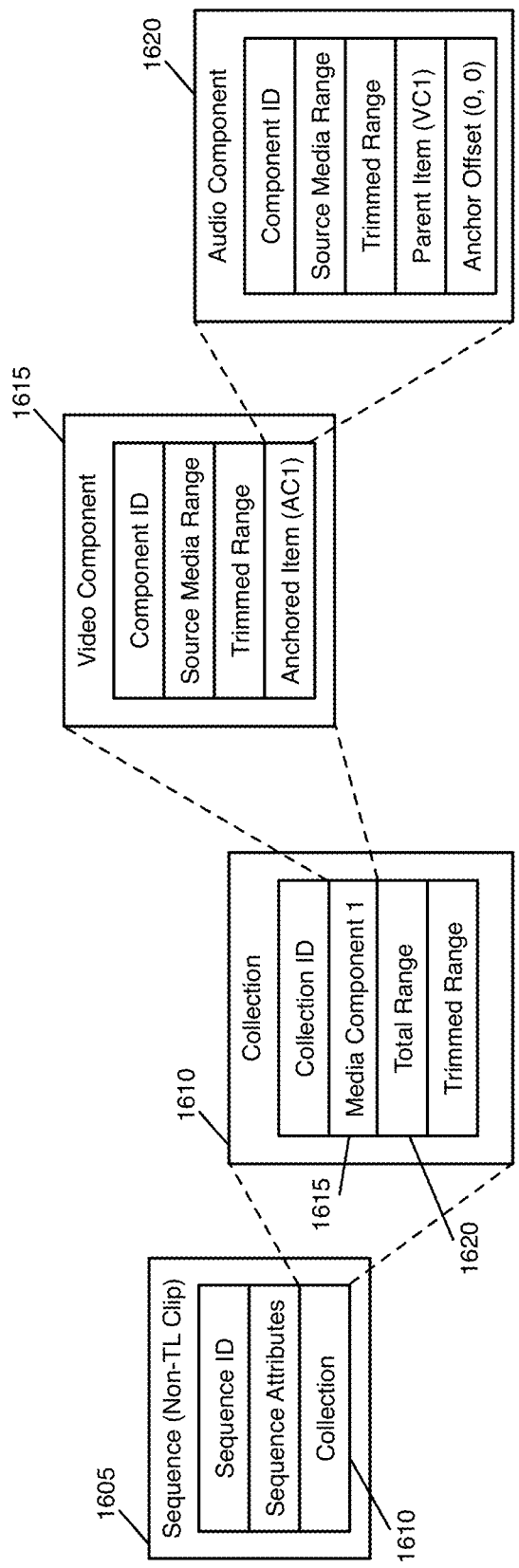
FIG. 16 conceptually illustrates a nested sequence of clip objects created by the media-editing application of some embodiments for an imported media file.

FIG. 16 conceptually illustrates a nested sequence of clip objects created by the media-editing application of some embodiments for an imported media file. In some embodiments, each of the clip objects shown in this figure is a member of the same class, though the object may be of different sub-classes. The media file whose clip structure is illustrated in FIG. 16 is a movie file that stores both audio and video information.

The figure illustrates a sequence 1605, a collection 1610, and two components 1615 and 1620. As mentioned, these three types of objects are all subclasses of clip objects (or anchored objects) in some embodiments. Some embodiments create a sequence within an event object for each imported media clip. The sequence 1605 stores a sequence ID, a set of sequence attributes, and the collection object 1610. The sequence ID is a unique identifier for the sequence object. The sequence attributes, in some embodiments, include video properties for the sequence, such as the resolution, frame rate, etc. The attributes may be set by a user in some embodiments, or set automatically based on the underlying media.

The collection object 1610 is an ordered array of clip objects. In the case of a clip imported into an event, as is the case with object 1610, the collection stores one or more component clips in the array. Often, the collection only stores the video component clip in the array, as shown here; any additional components (generally one or more audio components) are then anchored to that video component. In addition, the collection object 1610 stores a collection ID, a total range, and a trimmed range. The collection ID is a unique identifier for the collection object. The total range of a clip object indicates the maximum range for the object based on the objects it contains, while the trimmed range indicates the actual range of the object in its parent object according to user edits. In some embodiments, the collection object stores a value for the total range because the total range is a variable assigned to all types of clip objects, but this range is not actually used by the application. Instead, the application dynamically calculates the total range based on the objects contained by the collection (as opposed to updating the range value every time a clip is added to the collection). Some embodiments, on the other hand, do update the total range in the collection object. These ranges will be described in further detail below by reference to FIG. 17. The array of the collection object includes two media components 1615 and 1620. Collection objects, in some embodiments, can include component clip objects as well additional collections.

In the above paragraph and elsewhere in this section, a first object (e.g., the collection object 1610) is described as containing a second object (e.g., media component 1615 in the collection object's array). In some embodiments, a first object contains a second object by storing a reference to the object (e.g., a pointer). This reference is a strong pointer in some embodiments.

The media components shown include a video component 1615 and an audio component 1620. These are the same data structures as the component clip 1500, in some embodiments, and thus store the clip attributes and the asset reference shown in that figure. Each of the components stores a component ID (i.e., the clip ID of FIG. 15), a source media range (i.e., total range) and a trimmed range. For a component clip that refers to a media asset, the total range is the duration of the source media. The trimmed range is generally a subset of the total range (i.e., does include time outside the total range). However, in some embodiments, the application may use a range extender to extend the trimmed range past the total range (e.g., when needed for part of a transition, or if aligned audio runs slightly longer than video). Some embodiments will generate video images using, e.g., the first and last images of the video file, to fill in the needed extra range. When a clip is initially imported into the application, the total range and trimmed range will generally be equal as the user will not have edited the clip at all yet.

The video component 1615 also includes an anchored item set that contains the audio component 1620. As described above by reference to the timeline 115 in the user interface 100 of FIG. 1, clips can be anchored to other clips in some embodiments. When a particular clip is moved in a timeline, any clips anchored to the particular clip are moved along with it. Each clip can have numerous clips anchored to it, and can be anchored to a single clip. In the case of a media clip with audio and video components, some embodiments anchor the audio component to the video component. Thus the video component object 1615 contains the audio component in its set of anchored items (and could include numerous such items if there were additional audio components), while the audio component object 1620 includes a parent item reference to the video component to which it is anchored. In addition, the child (anchored) object stores an anchor offset that indicates two values. The first value is the position in the parent object to which the child object is anchored, and the second value is the offset within the child object of the anchor. In the case of an imported media file, the audio and video components will start at the same time, and thus both anchor offset values are zero. However, this can be modified if, for example, there is a slight offset in the recordings of the two components and the user has to adjust the audio relative to the video. The child object modifies both the first and second values when an anchor is moved relative to the anchored clip and the clip to which the anchored clip is anchored as described above by reference to FIG. 6.

Figure 17:
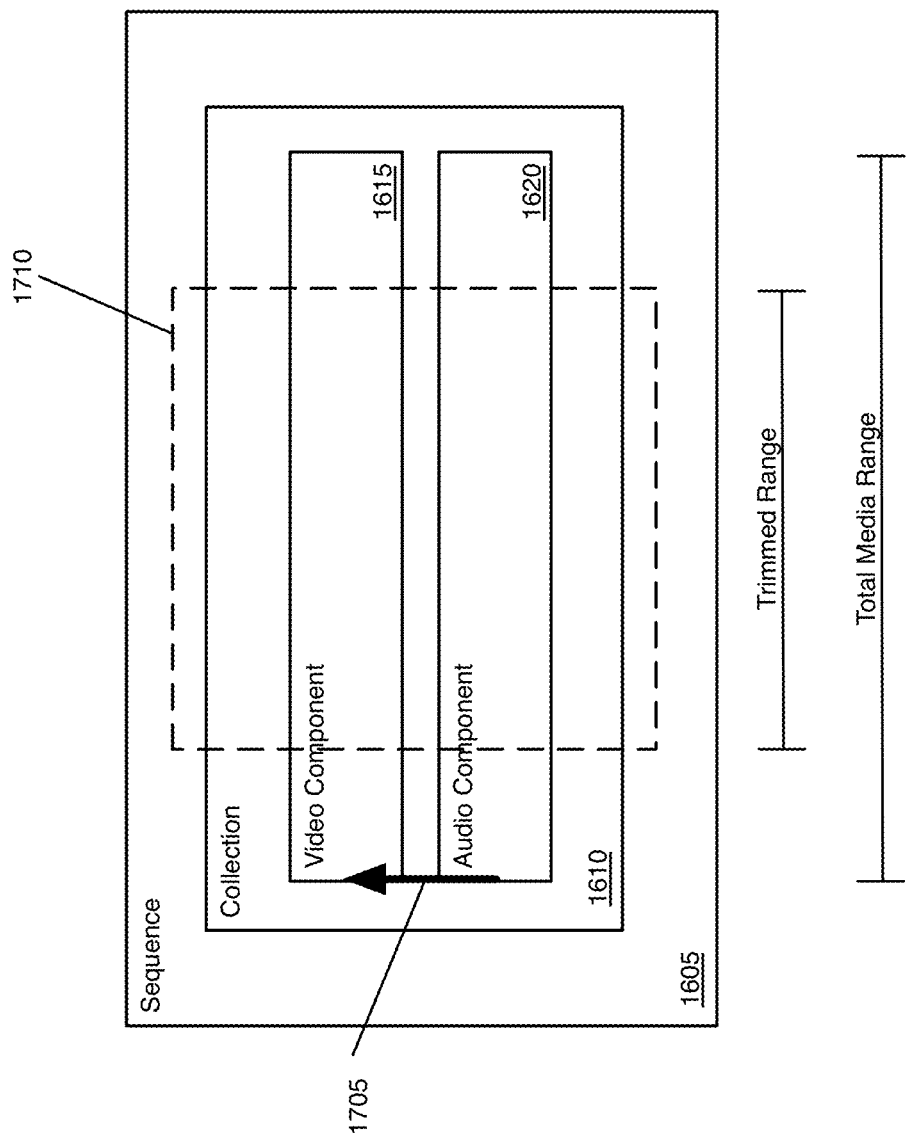
FIG. 17 conceptually illustrates objects nested in a conceptual timeline.

FIG. 17 conceptually illustrates the objects 1605-1620 nested in a conceptual timeline. The figure shows video and audio components 1615 and 1620 inside the collection 1610, which is nested inside the sequence 1605. The audio component 1620 is anchored to the video component 1615; specifically, as shown by the thick arrow 1705, the start of the audio component is anchored to the start of the video component.

The figure also includes a dashed box 1710 that illustrates that a user has trimmed the clips so that portions at the beginning and end of the clip are not part of the sequence were it to be rendered. Thus, the total media range of the components is the full length of the media to which they refer, whereas the trimmed range is a subset of this range based on the user edits.

In some embodiments, all clip objects store a total range and trimmed range. The collection 1610, in this case, will have the same total range and trimmed range as the components. However, if the components were offset, or if the collection included additional objects, it would have larger trimmed and total ranges. For sequence objects, the total range and trimmed ranges are always equal in some embodiments. In the illustrated case, the sequence 1605 has a range equal to the trimmed range of the collection 1610. As the user edits the objects in the sequence, both the trimmed and total ranges of the sequence change. In some embodiments, these ranges are based on units of time, number of frames, and/or number of audio samples.

As described in U.S. patent application Ser. No. 13/151,175, filed Jun. 1, 2011, the media-editing application of some embodiments provides a volume control for a user of the application to control the volume of a media clip displayed in the timeline. Using the volume control, the user manipulates the audio component 1620. Also, as described in U.S. patent application Ser. No. 13/151,175, filed Jun. 1, 2011, the media-editing application of some embodiments allows a user of the application to visually or logically decompose the audio portion of a media clip from the media clip that has both audio and media content in the timeline. The underlying data structure for a clip of which the video and audio portions are visually separated within the media clip representation in the timeline would look like the collection 1710. However, when the audio content (i.e., audio component) is separated out as a separate media clip, the separate media clip will look like the collection 1710 without the video component 1615. That is, when the audio and video portions are separated, the media clip will have a data structure that has both video and audio components like 1615 and 1620. However, when the video content and the audio content are separated as different media clips, each of the clips will have a different collection as its data structure.

In some embodiments, the media-editing application allows the user to selectively take one type of media content from a media clip when adding the media clip to the timeline as described in U.S. patent application Ser. No. 13/151,175, filed Jun. 1, 2011. When the media-editing application is in a mode to add only the audio component of a media clip to the timeline from the clip browser, the collection that will represent the added media clip will have only audio component like the component 1620. Similarly, when the media-editing application is in a mode to add only the video component of a media clip to the timeline from the clip browser, the collection that will represent the added media clip will have only video component like the component 1615.

Figure 18:
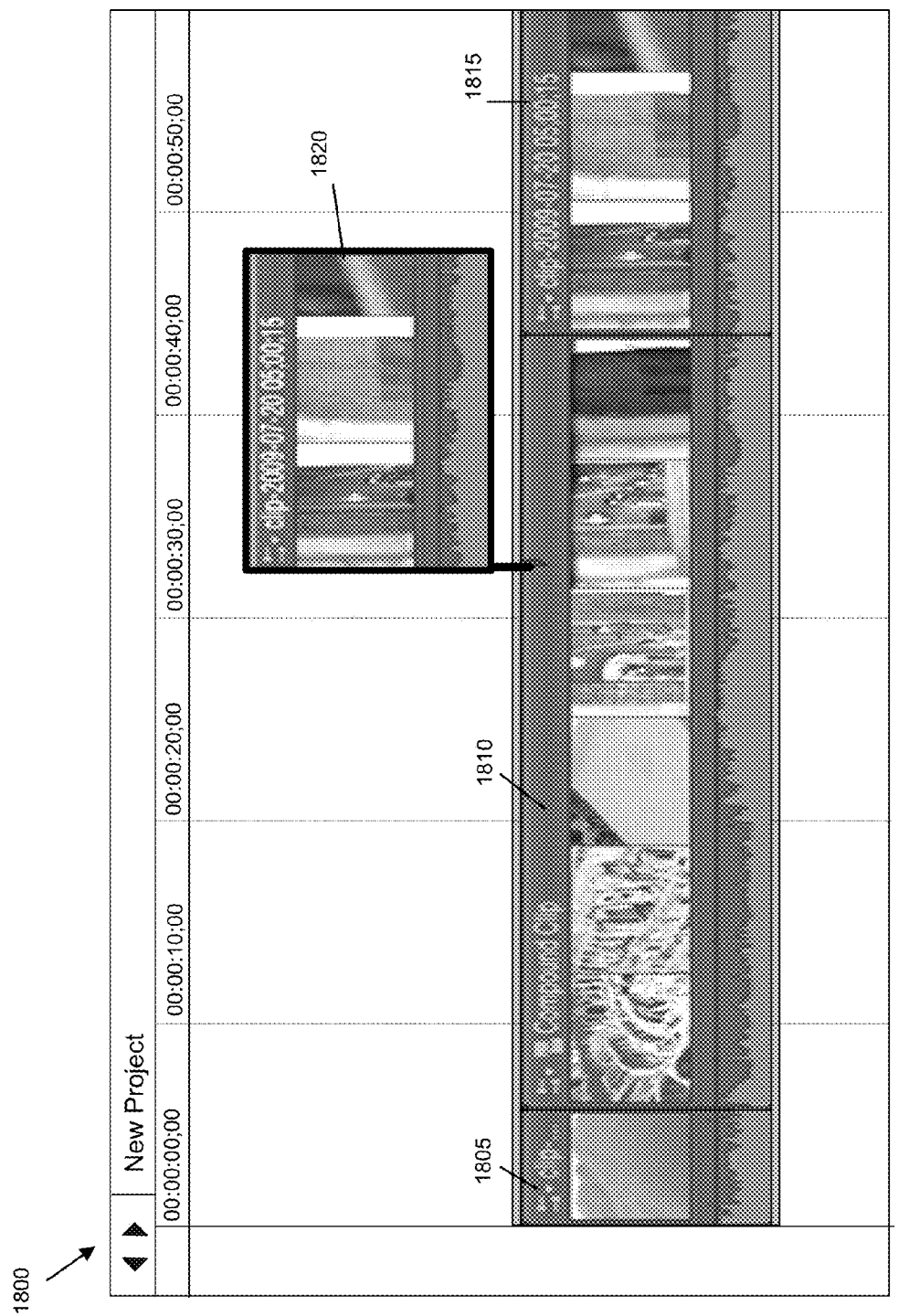
FIG. 18 illustrates a timeline of some embodiments.

FIG. 18 illustrates a timeline 1800 with a project title "New Project" that includes four clips 1805-1820. The clips 1805-1815 are in the primary compositing lane of the project's sequence, while the clip 1820 is anchored to clip 1810 at approximately 26 seconds into clip 1810. The clip 1810 is a compound clip that itself includes two clips.

Figure 19:
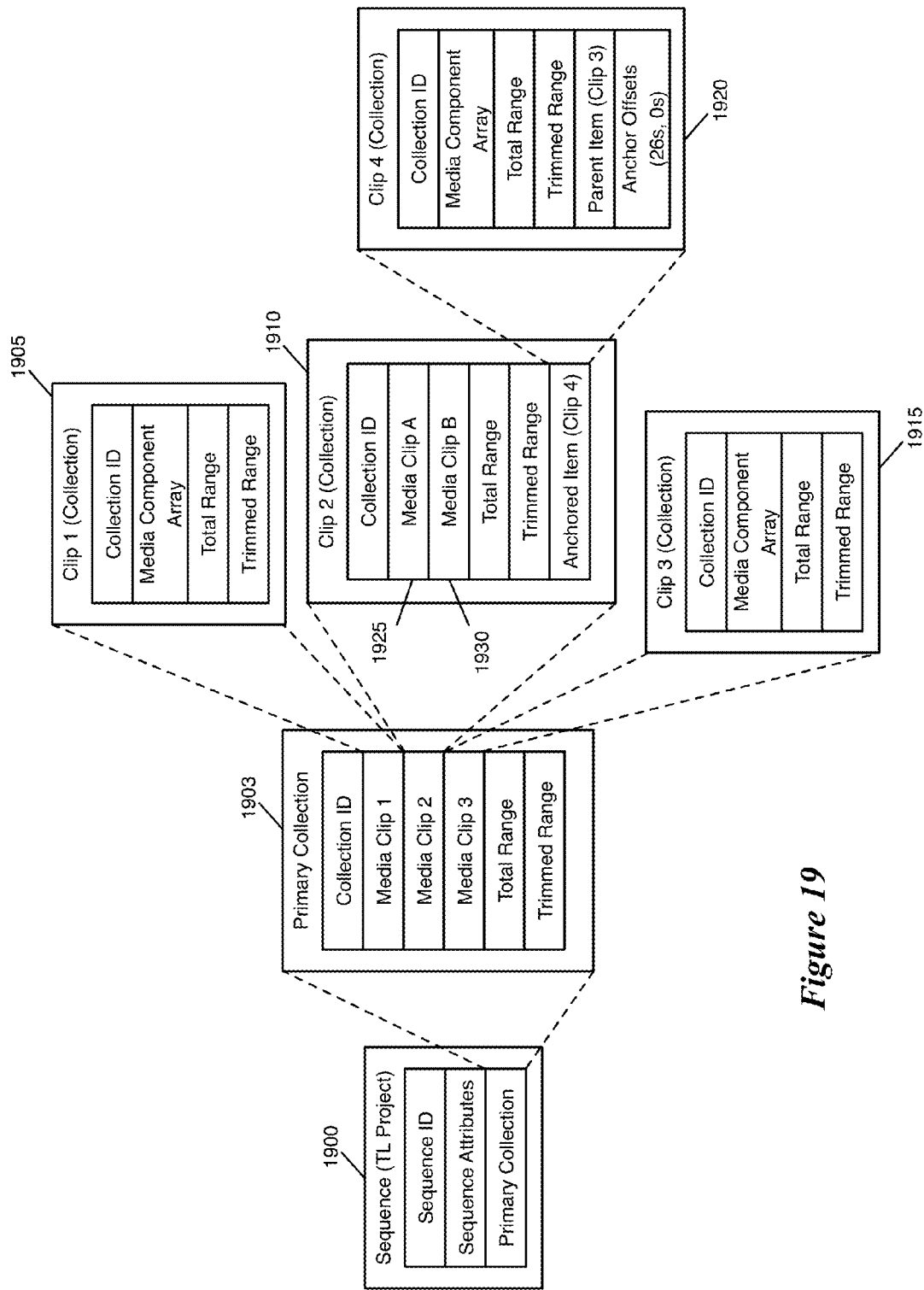
FIG. 19 conceptually illustrates a subset of the data structures for the sequence illustrated in FIG. 18.

FIG. 19 conceptually illustrates a subset of the data structures for the sequence illustrated in FIG. 18. In some embodiments, the data structures of FIG. 19 are all contained within a project data structure that contains a single sequence. In some embodiments, the project data structure for a project in the timeline is a sub-class of a class that also includes event data structures. Unlike the project data structures, the event data structures can contain multiple sequences, and in fact contain a sequence (such as sequence 1705) for each clip in the event.

FIG. 19 illustrates a sequence 1900 that includes a primary collection data structure 1903, which itself is an array of three collections 1905-1915 that correspond to the clips 1805-1815. In addition, the fourth clip 1820 is stored as a data structure within the collection 1910. For simplicity, the component objects are not shown in this figure. The sequence 1900 includes a sequence ID, sequence attributes, and the primary collection 1903. The sequence attributes for a project in the timeline are set by a user when creating the project, in some embodiments.

The primary collection 1903 includes the collection ID, total and trimmed range, and the array of media clips. In some embodiments, the array is ordered based on the location in the timeline and only includes media clips in the primary lane of the collection. The application assumes that there is no gap between these items, and thus no timing data is needed between the items. As shown, each of these clips is represented as a collection. When a clip stored in an event (e.g., the clip shown in FIG. 16) is added to a project in a timeline, some embodiments remove the sequence container data structure (e.g., structure 1605) and copy the rest of the structure (i.e., the collection and its components) into the data structure for the object in the timeline. A connected storyline, of which an example is described above by reference to FIG. 6, has a data structure similar to the primary collection 1903 in some embodiments. A reference to a connected storyline, however, will be listed in the media component array of the primary collection 1903 as an anchored clip.

Clips 1905, 1915, and 1920 are individual clips that have been added to the timeline from the clip browser, and thus do not themselves include collections. Similar to the collection 1610, these objects include an ID, total and trimmed ranges, and an array of media components (e.g., a video component and one or more audio components). The clip 1910 is a compound clip and therefore includes multiple clips in addition to the collection ID and ranges. Specifically, the clip 1910 includes two media clips 1925 and 1930. Within the collection, the clips are both in the primary lane of the collection, and thus one follows the next. These clip objects are not shown in this figure, but each of the clips is similar to clip 1905 in that the clips include an array of media components. In addition, the clip object 1910 includes a set of anchored items (in this case only the one item, clip 1920). Some embodiments include a set of anchored items for each collection, which are empty for the other objects shown in this figure. The anchor offset stored in clip 1920 indicates that it is anchored 26 seconds into clip 2, and that the anchor is at the start of clip 1920. These times refer to the trimmed ranges of the clips in some embodiments.

Figure 20:
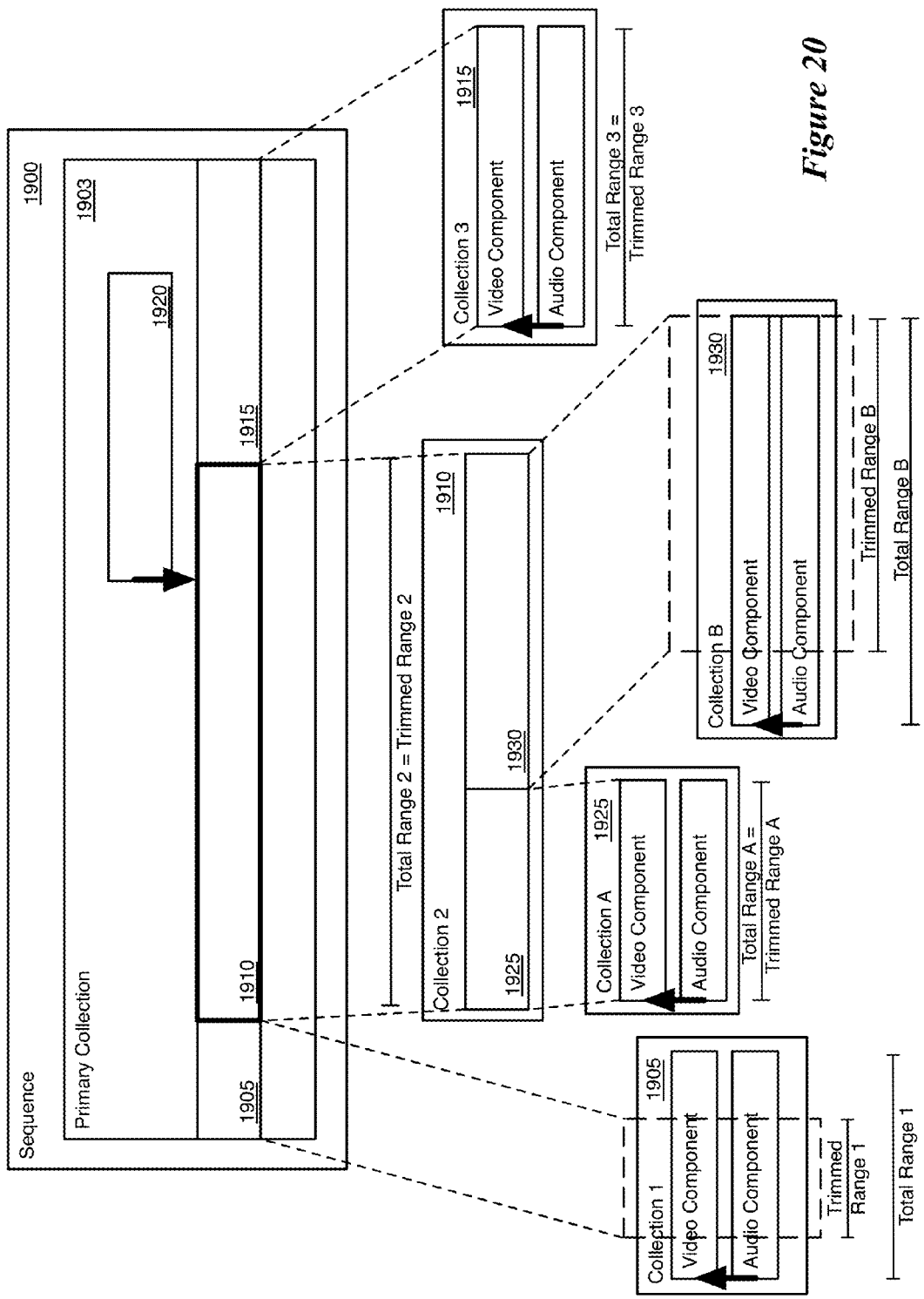
FIG. 20 conceptually illustrates objects nested in a conceptual timeline.

FIG. 20 conceptually illustrates the objects 1900-1930 nested in a conceptual timeline. As shown, collection objects 1925 and 1930 are nested inside the collection 1910, which is nested inside the primary collection object 1903 along with the collection objects 1905, 1915, and 1920. The collection object 1903 is itself nested inside a sequence object.

The figure illustrates the anchoring relationships between the various clips as well as the durations (ranges) of the clips. As with the clip objects shown in FIG. 17, each of the lowest level collections 1905, 1915, 1925, and 1930 each have an audio component anchored to a video component. While not shown, collection 1920 could also have the same video/audio setup, or could be just a video component (or just an audio component). While each of the objects shown has a single audio component, one of ordinary skill will recognize that some embodiments will have multiple audio components (e.g., if a camera records several audio tracks as separate files and imports the files with a video file as part of a single clip).

The figure also illustrates the anchoring of clip 1920 to clip 1910. In some cases, multiple clips will be anchored to the same primary lane clip, and the multiple anchored clips may overlap in time. In this case, multiple secondary lanes may be used. Some embodiments assign lane numbers to each clip object that indicates the clip object's lane within a collection.

All of the primary lane objects are assigned a lane number of zero in some embodiments, with lanes above the primary lane getting increasing numbers and lanes below the primary lane getting decreasing (negative) numbers. For instance, a separate audio clip might be anchored to a clip in the primary lane and displayed below the primary lane. In this case, within the primary collection 1903, the anchored clip 1920 has a lane number of 1. The lane numbers indicate compositing order for video in some embodiments. Whereas two audio files can be combined fairly easily (mixed), two video files cannot be displayed at the same time. Thus, some embodiments composite higher lane number clips on top of lower lane number clips. If no compositing effect is defined between two clips at the same time, then the clip in the higher lane will be displayed. However, various compositing modes and effects may be used to combine the pictures (e.g., compositing modes such as subtract, darken, multiply, etc. that combine pixel information of two images, as well as effects such as scaling the top image to get a picture-in-picture, applying a color mask to the top image, etc.).

The items in a lower-level nested collection will also have lane numbers that refer to their lane order within that collection. For example, the collection object 1910 has two clips 1925 and 1930, that each have a lane number of zero. However, this collection object could have anchored clips in multiple lanes. For the purpose of compositing at time of rendering, the items within the collection 1910 would be composited initially according to the ordering within the collection, then the output of that would be composited within the primary collection according to the ordering of the primary collection. Similarly, for each of the lowest-level collections (e.g., collection 1905), the video components are all lane zero and the audio components are lane −1.

FIG. 20 also illustrates the ranges (e.g., durations) of the various clip objects. For the lowest level collections and their components (e.g., collections 1905, 1915, 1925, 1930, and 1920), the trimmed range and the total range are determined in a manner similar to that shown in FIG. 17 for the collection object 1610. In this case, collections 1915 and 1955 are not trimmed at all, whereas collection 1905 is trimmed on both sides and the start of collection 1930 is trimmed.

For collection 1910, the total range is the sum of the trimmed ranges of its primary lane clips, which in this case are collections 1925 and 1930. Thus, the variable Total Range 2=Trimmed Range A+Trimmed Range B. In this case, the collection 1910 is not separately trimmed, such that its trimmed range equals its total range. This means that, although there is more media within clip 1930, while editing the primary collection 1903 the media-editing application will not allow a user to increase the duration of clip 1910 beyond that of Total Range 2. However, a user could open up the clip 1910 in the timeline and apply trim edits to either of clip 1925 and 1930. Modifications to the trimmed range of these clips will affect the total range of the clip 1910. In addition, within the primary collection 1903, a user can modify the trimmed range of clip 1910 to shorten the clip. Trimming from the beginning would result in less of the media of collection 1925 being used in the component presentation, while trimming from the end would result in less of the media of collection 1930 being used in the composite presentation.

The above figures illustrated various aspects of different subclasses of clip objects (e.g., sequences, collections, and components). One of ordinary skill will recognize that clip objects of some embodiments may have additional properties not shown in these figures. For instance, both collections and components may have an effect stack in some embodiments, which stores a stack of effects that are applied to the media in the clip when the application renders the clip. The application applies these affects to the media in an order designated by the effects stack, which can be modified by the user during editing. The effects may include audio effects that perform a transform on the audio or video effects that apply a function to the pixel values of the video images, in some embodiments. In fact, some embodiments store separate video and audio effects stacks.

In addition, one of ordinary skill in the art will recognize that some embodiments may have additional different subclasses of clip objects. For instance, some embodiments store generators, transitions, audition stacks, markers, and keywords as clip objects. A generator, in some embodiments, is an effect used in a composite presentation that creates its own video images rather than modifying existing images (e.g., clouds and other computer-generated effects that may rely on random processes). Some embodiments also use computer-generated gap elements in collections in specific circumstances. Details of gap elements are described in U.S. patent application Ser. No. 13/151,175, filed Jun. 1, 2011. If, for example, a user were to select clip objects 1905 and 1920 and create a compound clip from these objects, a gap element would be inserted into the collection object for the compound clip to take up the missing space of clip object 1910, which the user did not add to the collection. The clip object 1920 would then be anchored to this gap element. In some embodiments, these clips are not actually generators, but are special clips that produce neither audio nor video but add duration to a collection. As the generators create their own video images, they have a duration and this duration adds to the range of the collection containing the generator.

Transition objects, on the other hand, are used for transitions between two other clip objects. These objects have a range of 0, and do not add to the range of the container clip object. A transition object is stored in the array of its containing collection with an index between the indices of the two items between which it transitions. The transition object has a head and a tail that indicate the start and end of the transition between the clips.

Audition stack objects, or variants, store a list of possible clips for a particular index in a collection or for a particular anchor. That is, the audition stack object stores a set of clips, one of which is designated as active at any time. The properties of the stack object take on the properties of the active clip, such as the ranges, video properties (e.g., frame rate, resolution, etc.), audio properties, etc. Thus, when a user switches the active clip in the stack, some attributes of the stack may change. In addition, some of the objects in the stack may be collections that themselves have nested clips, while others might be simpler clip objects. When an audition stack object is anchored to another clip, some embodiments store the first portion of the anchor offset in the audition object (i.e., the offset within the parent clip), but store different offsets within the child clip for the different clips in the audition.

Marker objects store markers that a user adds to a specific time location in a collection. In some embodiments, marker objects have a duration of 1 frame, and store metadata indicating the type of marker (e.g., to do marker, analysis marker, etc.) and any notes about the marker that the user adds. Some embodiments anchor marker objects to a particular clip object. When calculating the duration of a collection, marker objects are specifically excluded from this calculation in some embodiments.

Finally, keyword objects store keyword tags about a clip object. Unlike markers, keywords have a range, as some embodiments provide the user the ability to tag a particular range of a clip rather than just associating the keyword with the entire clip. In some embodiments, a keyword object can store multiple keywords that have the same range. Some embodiments anchor keyword objects to the tagged clip object at the start of the range within the tagged object. Like markers, some embodiments specifically exclude keyword objects from the duration calculation for a collection.

Figure 21:
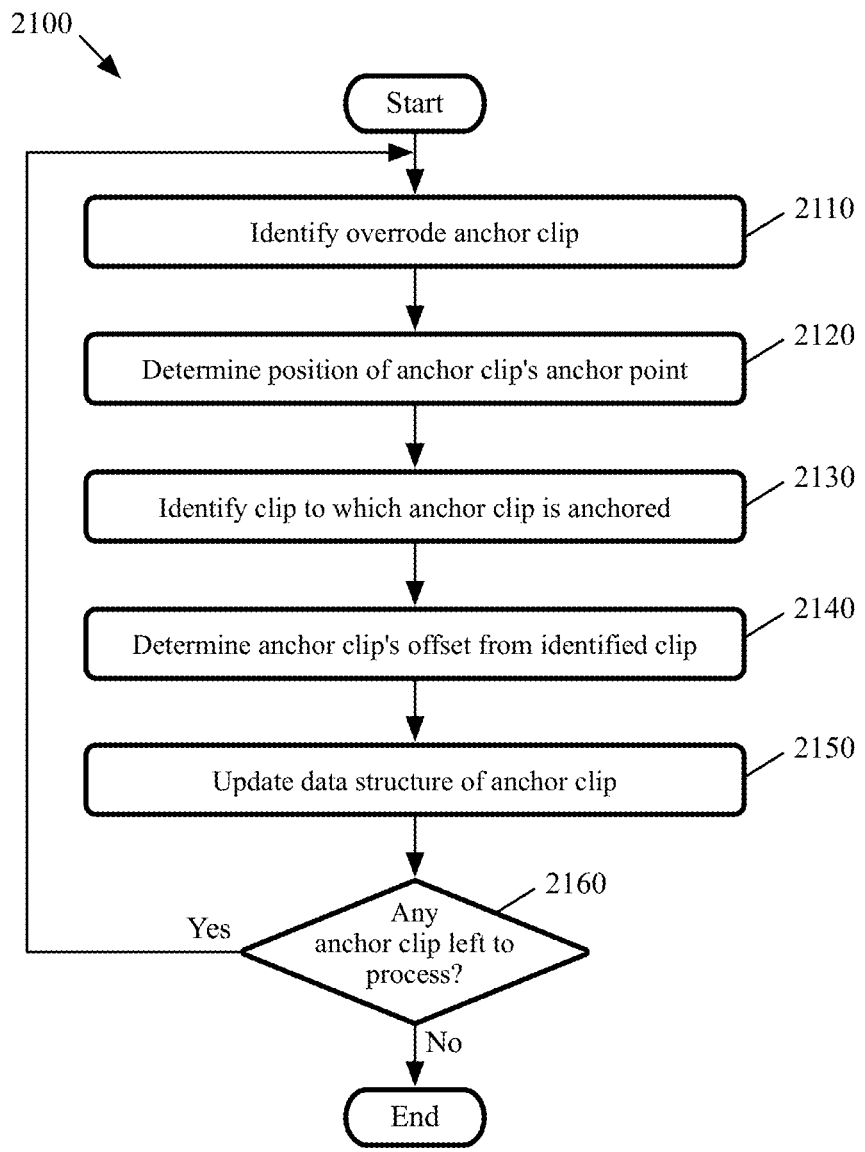
FIG. 21 conceptually illustrates a process of some embodiments for updating the data structures of anchored clips.

FIG. 21 conceptually illustrates a process 2100 of some embodiments for updating the data structures of anchored clips. In some embodiments, the media-editing application described above by reference to FIGS. 1-10 performs the process 2100 after an edit operation is performed on a clip with an anchor override feature activated. For instance, the media-editing application of some embodiments performs the process 2100 after the user completes an edit operation with an anchor override feature activated, such as the edit operations described above by reference to FIGS. 8-10.

The process 2100 begins by identifying (at 2110) an anchor clip that had its anchoring function overrode when an edit operation was performed with an anchor override feature activated. In some embodiments, the process 2100 identifies the anchor clip by identifying the particular clip on which the edit operation was performed and identifying a clip that was anchored to the particular clip before the edit operation was performed on the particular clip.

Next, the process 2100 determines (at 2120) the position of the anchor clip's anchor point in the media presentation. In some embodiments, the anchor point of the anchor clip is the position in the media presentation at which the anchor clip was anchored to the clip on before edit operation was performed. The process 2100 of some embodiments determines the anchor point of the anchor clip based on the in-point of the clip to which the anchor clip was anchored before the edit operation was performed and the anchor offset values stored in the anchor clip's data structure (e.g., the anchor offsets illustrated in FIGS. 16 and 19) in order to determine the duration from the beginning of the media presentation to the anchor clip's anchor point. In some embodiments, the media-editing application determines the anchor clip's anchor point before the edit operation is performed.

The process 2100 then identifies (at 2130) a clip to which the anchor clip is anchored after the edit operation is performed using the anchored override feature. In some embodiments, the process 2100 identifies the clip by iterating through the clips along the spine of the timeline starting from the beginning of the media presentation and identifying a clip with content that coincides with the anchor point of the anchor clip.

After identifying the clip, the process 2100 determines (at 2140) the anchor clip's offset from the identified clip. In some embodiments, the process 2100 determines the anchor point's offset from the identified clip by subtracting the position of the identified clip's in-point in the media presentation from the position of the anchor point of the anchor clip in the media presentation.

Next, the process 2100 updates (at 2150) the data structure of the anchor clip. In some embodiments, the media-editing application represents the anchor clip using one of the data structures described above by reference to FIGS. 16 and 19. The process 2100 of some such embodiments, updates the anchor offset value in the data structure that represents the position in the clip to which the anchor clip is anchored with the offset determined at operation 2140. In addition, the process 2100 updates the reference to anchor clip's parent item in the data structure with a reference to the identified clip.

Finally, the process 2100 determines (at 2160) whether any anchor clip is left to process. In some embodiments, the process 2100 determines that an anchor clip is left to process when the process 2100 has not processed an anchor clip that had its anchoring function overrode when an edit operation was performed with an anchor override feature activated. If the process 2100 determines that an anchor clip is left to process, the process 2100 returns to 2110 to continue processing any remaining anchor clips. Otherwise, the process 2100 ends.

Figure 22:
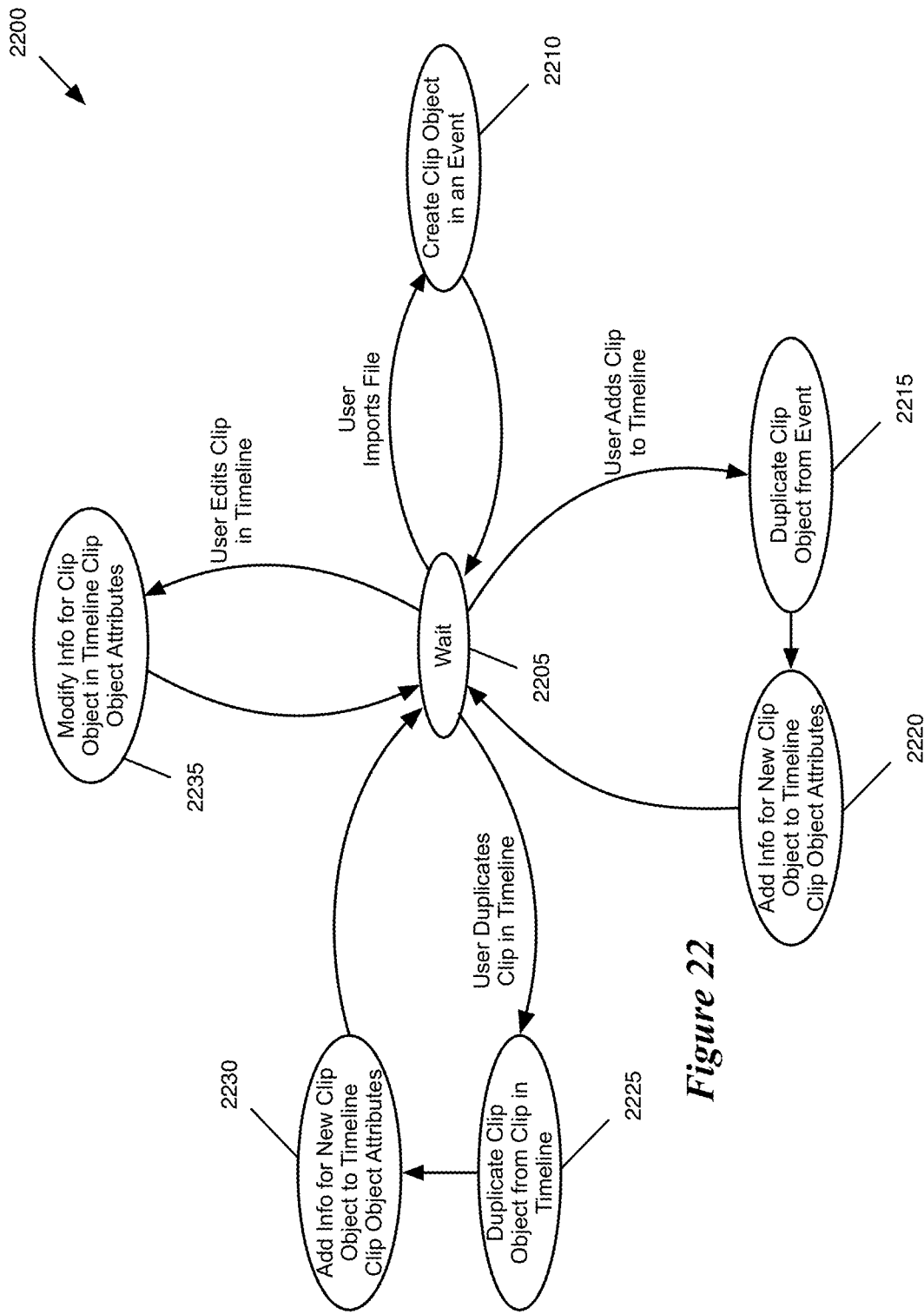
FIG. 22 conceptually illustrates a state diagram for a media-editing application of some embodiments.

FIG. 22 conceptually illustrates a state diagram 2200 for a media-editing application of some embodiments. Specifically, state diagram 2200 refers to the creation and modification of clip data due to various user actions. As shown, when the application is not receiving any such actions, the application is in the wait state 2205.

When a user imports a file, the application transitions to 2210 to create a clip object in an event for the imported file. The event may also need to be created, depending on whether the user is importing the file to an existing event. The clip object, as shown above, refers to an asset that refers to the file. The application then returns to the wait state 2205.

When the user adds a clip to the timeline (e.g., by dragging the clip from the browser to the timeline), the application transitions to 2215 and duplicates the clip object from the event to create a new clip object that is part of the project currently edited in the timeline. The clip data is partly the same (i.e., the same asset reference), but may also refer to only a portion of the asset (i.e., may have in and out points). In addition, the application transitions to 2220 to add information for the new clip object to the timeline clip object attributes. That is, the timeline is also represented by a clip object in some embodiments (e.g., may be a project, compound clip, etc.) and this data structure will be modified to refer to the new clip and store the position of the new clip. The application then returns to the wait state 2205.

When the user duplicates a clip in the timeline (as opposed to adding a clip from the browser), the application transitions to 2225 to duplicate the clip object from the clip in the timeline. This is a similar process as described above at state 2215. In addition, the information about the new clip is added to the timeline clip object at state 2230. Furthermore, at both state 2230 and state 2220, clip information in the timeline clip object may need to be modified to account for movement of other clips.

When the user edits a clip in the timeline (e.g., moves the clip), the application transitions to 2235 to modify the information for the edited clip object in the timeline clip object attributes. this may involve modifying its horizontal (time) and/or hierarchical position if the clip is moved. In addition, if the clip is trimmed, the information in the edited clip may need to be changed (i.e., its in and out points in the source media).

IV. Software Architecture

Figure 23:
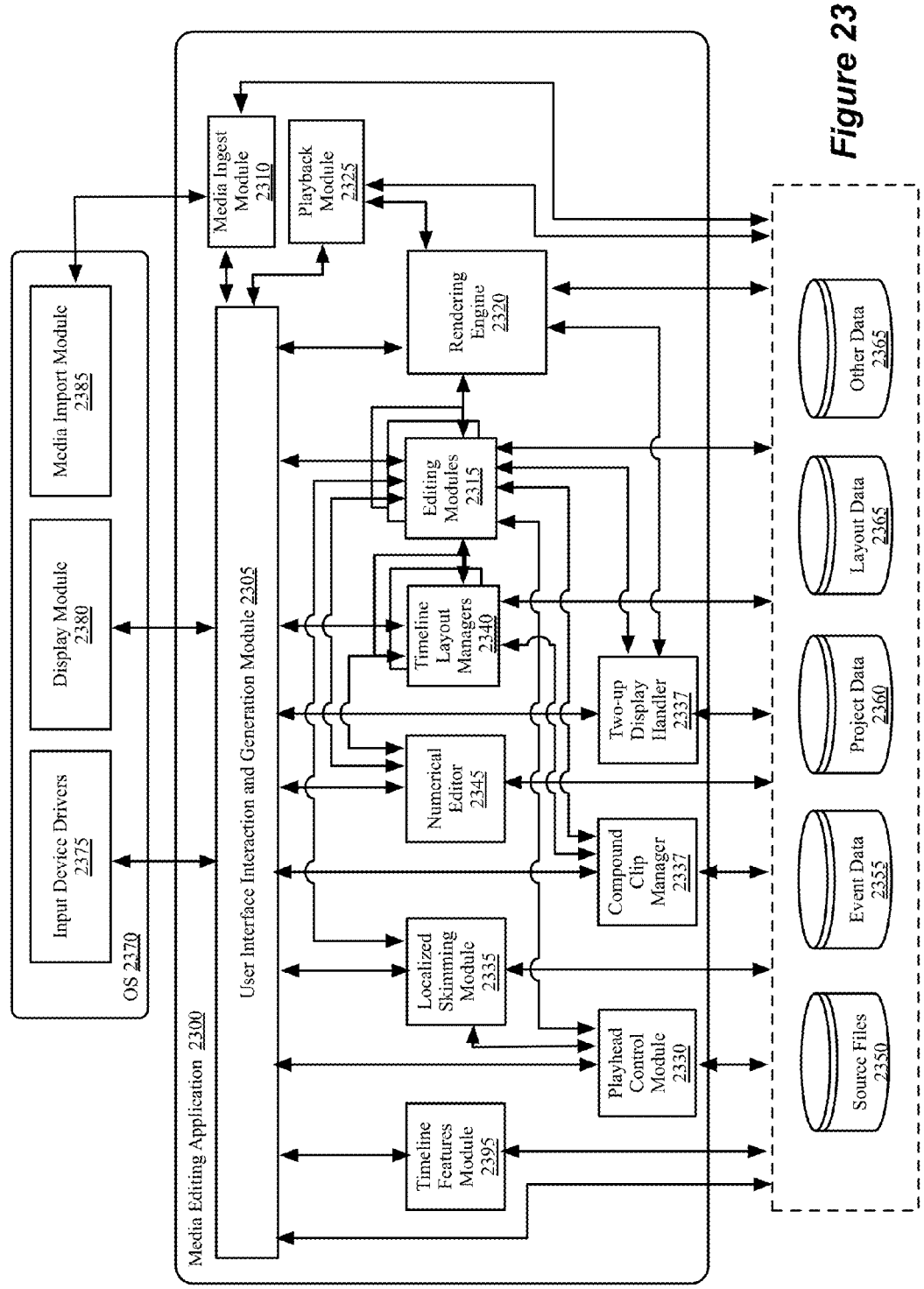
FIG. 23 conceptually illustrates the software architecture of a media editing application of some embodiments FIG. 24 conceptually illustrates an electronic system with which some embodiments of the invention are implemented.

In some embodiments, the processes described above are implemented as software running on a particular machine, such as a computer or a handheld device, or stored in a machine readable medium. FIG. 23 conceptually illustrates the software architecture of a media editing application 2300 of some embodiments. In some embodiments, the media editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The media editing application 2300 includes a user interface (UI) interaction and generation module 2305, a media ingest module 2310, editing modules 2315, rendering engine 2320, playback module 2325, timeline features module 2395, playhead control module 2330, localized skimming module 2335, numerical editor 2345, two-up display handler 2336, and compound clip manager 2337.

The figure also illustrates stored data associated with the media-editing application: source files 2350, events data 2355, project data 2360, layout data 2390, and render files 2365. In some embodiments, the source files 2350 store media files (e.g., video files, audio files, combined video and audio files, etc.) imported into the application. The source files 2350 of some embodiments also store transcoded versions of the imported files as well as analysis data (e.g., people detection data, shake detection data, color balance data, etc.). The events data 2355 stores the events information used by some embodiments to populate the clip library and clip browser. The events data may be a set of clip object data structures stored as one or more SQLite database files (or other format) in some embodiments. The project data 2360 stores the project information used by some embodiments to specify a composite presentation in the timeline. The project data may also be a set of clip object data structures stored as one or more SQLite database files (or other format) in some embodiments. The layout data 2390 stores layout information (e.g., coordinates, length, width, lane numbers, etc.) of all clips that are displayed in the timeline. In some embodiments, the layout data 2390 is part of the project data 2360. The render files 2365 of some embodiments may include thumbnail-sized images for display in the clip browser or timeline, audio waveform displays for media clips, as well as rendered segments of a timeline sequence for use in playback. In some embodiments, the four sets of data 2350-2365 are stored in one physical storage (e.g., an internal hard drive, external hard drive, etc.). In some embodiments, the data may be split between multiple physical storages. For instance, the source files might be stored on an external hard drive with the events data, project data, and render files on an internal drive. Some embodiments store events data with their associated source files and render files in one set of folders, and the project data with associated render files in a separate set of folders.

FIG. 23 also illustrates an operating system 2370 that includes input device driver(s) 2375, display module 2380, and media import module 2385. In some embodiments, as illustrated, the device drivers 23875, display module 2380, and media import module 2385 are part of the operating system even when the media editing application 2300 is an application separate from the operating system.

The input device drivers 2375 may include drivers for translating signals from a keyboard, mouse, touchpad, tablet, touchscreen, etc. A user interacts with one or more of these input device, which send signals to their corresponding device driver. The device driver then translates the signals into user input data that is provided to the UI interaction and generation module 2305.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 2380 translates the output of a user interface for a display device. That is, the display module 2380 receives signals (e.g., from the UI interaction and generation module 2305) describing what should be displayed and translates these signals into pixel information that is sent to the display device. The display device may be an LCD, plasma screen, CRT monitor, touchscreen, etc.

The media import module 2385 receives media files (e.g., audio files, video files, etc.) from storage devices (e.g., external drives, recording devices, etc.) through one or more ports (e.g., a USB port, Firewire port, etc.) of the device on which the application 2300 operates and translates this media data for the media-editing application or stores the data directly onto a storage of the device.

The UI interaction and generation module 2305 of the media editing application 2300 interprets the user input data received from the input device drivers and passes it to various modules, including the media ingest module 2310, the editing modules 2315, the rendering engine 2320, the playback module 2325, the timeline features module 2395, the playhead control module 2330, the localized skimming module 2335, the numerical editor 2345, the two-up display handler 2336, the compound clip manager 2327, and the timeline layout managers 2340. The UI interaction module also manages the display of the UI, and outputs this display information to the display module 2380. This UI display information may be based on information from the editing modules 2325, the playback module 2325, the timeline features module 2395, the playhead control module 2330, the localized skimming module 2335, the numerical editor 2345, the two-up display handler 2336, the compound clip manager 2337 and the data 2350, 2355, 2360, 2390, and 2365.

The media ingest module 2310 manages the import of source media into the media-editing application 2300. Some embodiments, as shown, receive source media from the media import module 2385 of the operating system 2370. The media ingest module 2310 receives instructions through the UI module 2305 as to which files should be imported, then instructs the media import module 2385 to enable this import (e.g., from an external drive, from a camera, etc.). The media ingest module 2310 stores these source files 2350 in specific file folders associated with the application. In some embodiments, the media ingest module 2310 also manages the creation of event data structures upon import of source files and the creation of the clip and asset data structures contained in the events.

The editing modules 2315 include a variety of modules for editing media in the clip browser as well as in the timeline. The editing modules 2315 handle the creation of projects, addition and subtraction of clips from projects, trimming or other editing processes within the timeline (e.g., inserting, deleting, anchoring, appending, etc.), application of anchor overrides for editing operations, application of effects and transitions, or other editing processes. In some embodiments, the editing modules 2315 create and modify project and clip data structures in both the event data 2355 and the project data 2360. Moreover, the editing modules 2315 works with the timeline layout managers 2340 to manage the layouts of the clips and effects (e.g., transitions) displayed in the timeline.

The rendering engine 2320 handles the rendering of images for the media-editing application. In some embodiments, the rendering engine manages the creation of images for the media-editing application. When an image is requested by a destination within the application (e.g., the playback module 2325) the rendering engine outputs the requested image according to the project or event data. The rendering engine retrieves the project data or event data that identifies how to create the requested image and generates a render graph that is a series of nodes indicating either images to retrieve from the source files or operations to perform on the source files. In some embodiments, the rendering engine schedules the retrieval of the necessary images through disk read operations and the decoding of those images.

The playback module 2325 handles the playback of images (e.g., in a preview display area of the user interface. Some embodiments do not include a playback module and the rendering engine directly outputs its images to the UI module 2310 for integration into the GUI, or directly to the display module 2380 for display at a particular portion of the display device.

In some embodiments, the render engine performs various operations to generate an output image. In some embodiments, these operations include blend operations, effects (e.g., blur or other pixel value modification operations), color space conversions, resolution transforms, etc. In some embodiments, one or more of these processing operations are actually part of the operating system and are performed by a GPU or CPU of the device on which the application 2300 operates. The output of the rendering engine (a rendered image) may be stored as render files in storage 2365 or sent to a destination for additional processing or output (e.g., playback).

The timeline layout managers 2340 manage the layouts of the clips and effects (e.g., transitions) displayed in the timeline. For instance, the layout managers 2340 update the layout data 2365 as media clips in the timeline changes (e.g., by being edited, moved, deleted, etc.). The timeline layout managers 2340 interact with the editing modules 2315 to receive editing operations performed on the items displayed in the timeline. The timeline layout managers 2340 also interact with the numerical editor 2345 as well to get any editing updates. In some embodiments, each timeline layout manager has a one-to-one relationship with the spine in managing the layouts of the clips that are in the spine or anchored to the clips in the spine. When the timeline displays inside of a compound clip, a new layout manager may be associated with that particular state of timeline to manage the media clips within the compound clip. As described above, the timeline layout managers 2340 may work with the editing modules 2315 in managing the layouts of the clips displayed in the timeline.

The timeline features module 2395 handles various features of the timeline in some embodiments provide. For instance, the timeline features module 2395 manages the separation of audio and video portion of a media clip displayed in the timeline. The timeline features module 2395 also controls the volume of a media clip that has audio content. Moreover, the timeline features module 2395 also handles the customization of the timeline and changes the ratio of the audio and video portions of each media clip in the timeline. These timeline features are described in U.S. patent application Ser. No. 13/151,175, filed Jun. 1, 2011. The timeline features module 2395 also communicates with the timeline layout managers 2340 and the editing modules 2315 for handling any changes in the layouts of the clips in the timeline and editing operations performed by using the provided timeline features.

The playhead control module 2330 manages playheads in the timeline in some embodiments. The playhead control module 2330 communicates with the editing modules 2315 to manage editing operations that are performed by using playheads. For instance, the playhead control module 2330 works with the editing modules 2315 for anchoring media clips based on the position of the primary playhead in the timeline. The playheads of some embodiments are described in U.S. patent application Ser. No. 13/151,175, filed Jun. 1, 2011.

The localized skimming module 2335 performs localized skimming operation described in U.S. patent application Ser. No. 13/151,175, filed Jun. 1, 2011. In some embodiments, the localized skimming module 2335 communicates with playhead control module to receive information regarding playhead positions. Also, the localized skimming module 2335 sends requests to rendering engine 2320 produce appropriate frames and images to display based on the position of the playhead and cursor.

The numerical editor 2345 receives numerical inputs through the UI interaction and generation module 2305 regarding the position of a media clip, playhead, or other items in the timeline. The numerical editor 2345 precisely specifies the duration of a media clip, accurately specifies the starting and/or ending point of a media clip in the timeline, and specifies the location of a playhead, etc. Examples of numerical editing are described in U.S. patent application Ser. No. 13/151,175, filed Jun. 1, 2011. In some embodiments, the numerical editor 2345 communicates with the timeline layout managers 2340 and the editing modules 2315 to facilitate the editing operations based on the received numerical inputs.

The two-up display handler 2336 in some embodiments communicates with the editing modules 2315 to prepare requests to the rendering engine 2320 for generating two frames on or neighboring the edit point. Examples of displaying two frames of an edit point are described in U.S. patent application Ser. No. 13/151,175, filed Jun. 1, 2011.

The compound clip manager 2337 manages the creation and manipulation of compound clips. Examples of creating and manipulating compound clips are described in U.S. patent application Ser. No. 13/151,175, filed Jun. 1, 2011. The compound clip manager 2337 in some embodiments communicates with the timeline layout managers 2340 and the editing modules 2315.

While many of the features of media-editing application 2300 have been described as being performed by one module (e.g., the UI interaction and generation module 2305, the media ingest manager 2310, etc.), one of ordinary skill in the art will recognize that the functions described herein might be split up into multiple modules. Similarly, functions described as being performed by multiple different modules might be performed by a single module in some embodiments (e.g., the playback module 2325 might be part of the UI interaction and generation module 2305).

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 24:
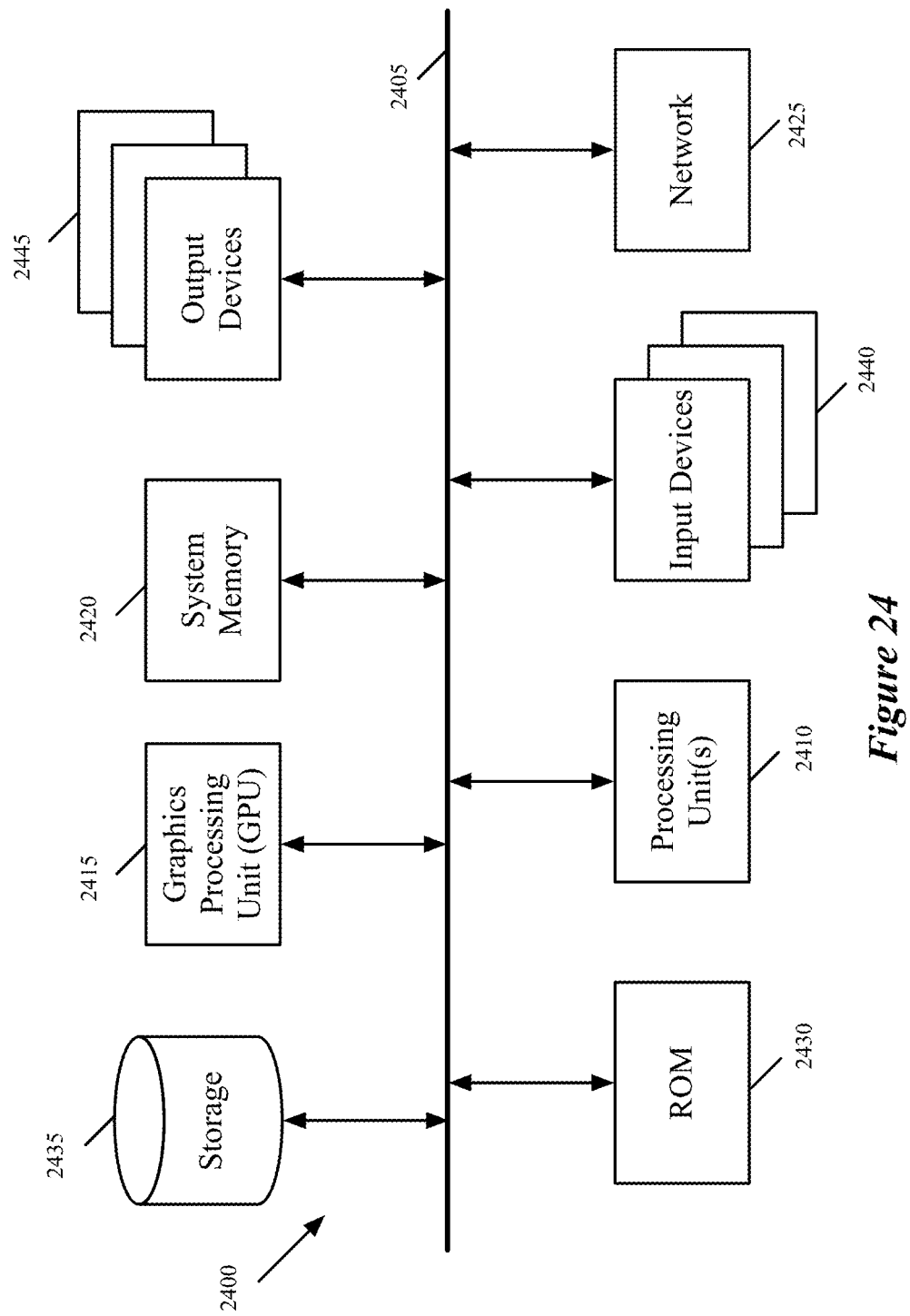

FIG. 24 conceptually illustrates an electronic system 2400 with which some embodiments of the invention are implemented. The electronic system 2400 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2400 includes a bus 2405, processing unit(s) 2410, a graphics processing unit (GPU) 2415, a system memory 2420, a network 2425, a read-only memory 2430, a permanent storage device 2435, input devices 2440, and output devices 2445.

The bus 2405 collectively represents all system, peripheral, and chipset buses that communicatively connect the numerous internal devices of the electronic system 2400. For instance, the bus 2405 communicatively connects the processing unit(s) 2410 with the read-only memory 2430, the GPU 2415, the system memory 2420, and the permanent storage device 2435.

From these various memory units, the processing unit(s) 2410 retrieves instructions to execute and data to process in order to execute the processes of the invention. The processing unit(s) may be a single processor or a multi-core processor in different embodiments. Some instructions are passed to and executed by the GPU 2415. The GPU 2415 can offload various computations or complement the image processing provided by the processing unit(s) 2410. In some embodiments, such functionality can be provided using CoreImage's kernel shading language.

The read-only-memory (ROM) 2430 stores static data and instructions that are needed by the processing unit(s) 2410 and other modules of the electronic system. The permanent storage device 2435, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive) as the permanent storage device 2435.

Other embodiments use a removable storage device (such as a floppy disk, flash memory device, etc., and its corresponding disk drive) as the permanent storage device. Like the permanent storage device 2435, the system memory 2420 is a read-and-write memory device. However, unlike storage device 2435, the system memory 2420 is a volatile read-and-write memory, such as random access memory. The system memory 2420 stores some of the instructions and data that the processor needs at runtime. In some embodiments, the invention's processes are stored in the system memory 2420, the permanent storage device 2435, and/or the read-only memory 2430. For example, the various memory units include instructions for processing multimedia clips in accordance with some embodiments. From these various memory units, the processing unit(s) 2410 retrieves instructions to execute and data to process in order to execute the processes of some embodiments.

The bus 2405 also connects to the input and output devices 2440 and 2445. The input devices 2440 enable the user to communicate information and select commands to the electronic system. The input devices 2440 include alphanumeric keyboards and pointing devices (also called "cursor control devices"), cameras (e.g., webcams), microphones or similar devices for receiving voice commands, etc. The output devices 2445 display images generated by the electronic system or otherwise output data. The output devices 2445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 24, bus 2405 also couples electronic system 2400 to a network 2425 through a network adapter (not shown). In this manner, the computer can be a part of a network of computers (such as a local area network ("LAN"), a wide area network ("WAN"), or an Intranet, or a network of networks, such as the Internet. Any or all components of electronic system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 11, 12, 14, and 21) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium storing a media-editing application which when executed by at least one processing unit provides a graphical user interface (GUI) for creating a composite media presentation from a plurality of media clips, the GUI comprising:
   a composite display area for placing media clips to specify the composite media presentation, the composite display area comprising a primary lane for placing a primary sequence of media clips and a plurality of secondary lanes for placing media clips that are anchored to media clips in the primary lane; and
   an editing tool comprising a first mode for performing an edit operation to a particular media clip in the primary lane and a set of media clips in a secondary lane anchored to the particular media clip and a second mode for performing the edit operation to the particular media clip without performing the edit operation to the set of media clips anchored to the particular media clip, wherein each media clip in the set of media clips in the secondary lane is connected to the particular media clip in the primary lane by an anchor at a position that defines a relationship between media content of the media clip in the secondary lane and the particular media clip in the primary lane.

2. The non-transitory machine readable medium of claim 1, wherein the edit operation comprises moving the particular media clip from a first position in the primary lane to a second, different position in the primary lane.

3. The non-transitory machine readable medium of claim 1, wherein the edit operation comprises moving the particular media clip from a first position to a second, different position in the primary lane while maintaining an order of the primary sequence of media clips in the primary lane.

4. The non-transitory machine readable medium of claim 3, wherein the edit operation further comprises extending a duration of a first media clip adjacent to the particular media clip in the primary lane.

5. The non-transitory machine readable medium of claim 4, wherein the edit operation further comprises shortening a duration of a second media clip adjacent to the particular media clip in the primary lane.

6. The non-transitory machine readable medium of claim 5, wherein a first amount of the first media clip's duration that is extended is the same as a second amount of the second media clip's duration that is shortened.

7. The non-transitory machine readable medium of claim 2, wherein moving the particular media clip from the first position to the second, different position in the primary lane does not affect a duration of the composite media presentation.

8. The non-transitory machine readable medium of claim 1, wherein each secondary lane in the composite display area is for placing different media clips of different media types.

9. The non-transitory machine readable medium of claim 1, wherein the primary sequence of media clips comprises different media clips of different media types.

10. A method of providing a graphical user interface (GUI) for a media-editing application, the method comprising:
    providing a composite display area for placing media clips to specify a composite media presentation, the composite display area comprising a central compositing lane for placing a primary sequence of media clips and a set of anchor lanes for anchoring media clips to media clips in the central compositing lane; and
    providing an editing tool comprising an anchor override option, the editing tool for:
      applying an edit operation to a particular media clip in the central compositing and a set of media clips in an anchor lane anchored to the particular media clip when the anchor override option is deactivated; and
      applying the edit operation to the particular media clip without applying the edit operation to the set of media clips anchored to the particular media clip when the anchor override option is activated,
      wherein each media clip in the set of media clips in the anchor lane is connected to the particular media clip in the central compositing lane by an anchor at a position that defines a relationship between media content of the media clip in the anchor lane and the particular media clip.

11. The method of claim 10, wherein each anchor lane in the composite display area is for placing different media clips of different media types.

12. The method of claim 10 further comprising:
    providing a preview display area for displaying the composite media presentation; and
    providing a playhead for tracking a cursor position and identifying frames of the composite media presentation based on the cursor position, the preview display area further for displaying the identified frames of the composite media presentation.

13. The method of claim 10 further comprising providing a clip browser for displaying media clips available for placement in the composite display area.

14. The method of claim 10, wherein when applying the edit operation to the particular media clip while the anchor override option is activated causes at least one media clip in the set of media clips to be anchored to another media clip in the central compositing lane.

15. The method of claim 10, wherein the edit operation comprises modifying an in-point and an out-point of the particular media clip.

16. The method of claim 15, wherein the edit operation modifies the in-point and the out-point of the particular media clip while maintaining a duration of the composite media presentation.

17. The method of claim 15, wherein the edit operation modifies each of the in-point and the out-point of the particular media clip by a same duration amount.

18. The method of claim 15, wherein the edit operation modifies the in-point and the out-point of the particular media clip while maintaining a position of the particular media clip in the central compositing lane.

19. The method of claim 10, wherein the anchor override option is activated based on a keyboard input.

20. The method of claim 16, wherein the in-point and out-point of the particular media clip specify a starting frame and an ending frame of the particular media clip respectively in a source media file associated with the particular media clip.

* * * * *